United States Patent
Zhang et al.

(10) Patent No.: US 11,463,705 B2
(45) Date of Patent: Oct. 4, 2022

(54) INTRA-PREDICTION MODE PROPAGATION

(71) Applicant: QUALCOMM Incorporated, San Diego, CA (US)

(72) Inventors: Kai Zhang, San Diego, CA (US); Jianle Chen, San Diego, CA (US); Xiang Li, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/926,550

(22) Filed: Mar. 20, 2018

(65) Prior Publication Data

US 2018/0278942 A1 Sep. 27, 2018

Related U.S. Application Data

(60) Provisional application No. 62/475,149, filed on Mar. 22, 2017.

(51) Int. Cl.
*H04N 7/18* (2006.01)
*H04N 19/159* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC ...... H04N 19/176; H04N 19/61; H04N 19/70; H04N 19/105; H04N 19/593; H04N 19/159; H04N 19/11; H04N 19/186; H04N 19/46; H04N 19/463; H04N 19/139; H04N 19/30; H04N 19/107; H04N 19/109; H04N 19/187; H04N 19/136; H04N 19/31; H04N 19/44; H04N 19/52; H04N 19/124; H04N 19/503; H04N 19/513; H04N 19/172; H04N 19/51;
(Continued)

(56) References Cited

U.S. PATENT DOCUMENTS 8,619,856 B2 * 12/2013 Chen .................... H04N 19/147
375/240.12
9,307,255 B2 4/2016 Kim et al.
(Continued)

FOREIGN PATENT DOCUMENTS

WO 2017018664 A1 2/2017
WO 2017144017 A1 8/2017

OTHER PUBLICATIONS

Guo et al., Inter-layer intra mode prediction for scalable extension of HEVC (Year: 2013).*
(Continued)

*Primary Examiner* — Tsion B Owens
(74) *Attorney, Agent, or Firm* — Shumaker & Sieffert, P.A.

(57) ABSTRACT

A method of decoding video data, including receiving a first block of video data encoded using an inter-prediction mode associating a first intra-prediction mode with the first block of video data, wherein the first intra-prediction mode is associated with a second block of video data, and determining a second intra-prediction mode for a neighbor block of video data based at least in part on the first intra-prediction mode.

42 Claims, 18 Drawing Sheets

(51) Int. Cl.
  *H04N 19/176* (2014.01)
  *H04N 19/11* (2014.01)
  *H04N 19/593* (2014.01)
  *H04N 19/61* (2014.01)
  *H04N 19/139* (2014.01)
  *H04N 19/463* (2014.01)
  *H04N 19/105* (2014.01)

(52) U.S. Cl.
  CPC ......... *H04N 19/139* (2014.11); *H04N 19/176* (2014.11); *H04N 19/463* (2014.11); *H04N 19/593* (2014.11); *H04N 19/61* (2014.11)

(58) Field of Classification Search
  CPC ...... H04N 19/13; H04N 19/182; H04N 19/91; H04N 19/117; H04N 19/436; H04N 19/119
  USPC ...................................................... 375/240.12
  See application file for complete search history.

(56) References Cited

U.S. PATENT DOCUMENTS

| | | | | |
|---|---|---|---|---|
| 9,479,777 | B2* | 10/2016 | Sugio | H04N 19/159 |
| 9,596,482 | B2* | 3/2017 | La | H04N 19/31 |
| 9,602,832 | B2* | 3/2017 | Choi | H04N 19/172 |
| 9,654,785 | B2* | 5/2017 | Chien | H04N 19/176 |
| 9,906,801 | B2* | 2/2018 | Chiu | H04N 19/129 |
| 10,212,448 | B2* | 2/2019 | Choi | H04N 19/172 |
| 10,404,994 | B2* | 9/2019 | Chiu | H04N 19/52 |
| 10,412,404 | B2* | 9/2019 | Sugio | H04N 19/513 |
| 2003/0123537 | A1* | 7/2003 | Yona | H04N 7/152 375/240.01 |
| 2005/0036552 | A1* | 2/2005 | Takahashi | H04N 19/112 375/240.16 |
| 2007/0160133 | A1* | 7/2007 | Bao | H04N 19/159 375/E7.17 |
| 2008/0007438 | A1 | 1/2008 | Segall et al. | |
| 2008/0089424 | A1* | 4/2008 | Karczewicz | H04N 19/187 375/E7.17 |
| 2008/0101473 | A1* | 5/2008 | Tanaka | H04N 19/16 375/240.16 |
| 2008/0152004 | A1* | 6/2008 | Fujisawa | H04N 19/109 375/240.12 |
| 2008/0212677 | A1* | 9/2008 | Chen | H04N 19/194 375/E7.176 |
| 2008/0240245 | A1* | 10/2008 | Lee | H04N 19/139 375/240.16 |
| 2009/0097558 | A1* | 4/2009 | Ye | H04N 19/46 375/E7.076 |
| 2010/0054334 | A1* | 3/2010 | Yoo | H04N 19/573 375/240.14 |
| 2010/0169626 | A1* | 7/2010 | Wang | G06F 9/3848 712/239 |
| 2011/0222790 | A1* | 9/2011 | Zhang | H04N 19/463 382/238 |
| 2011/0261883 | A1* | 10/2011 | Bang | H04N 19/597 375/E7.125 |
| 2011/0310967 | A1* | 12/2011 | Zhang | H04N 19/176 375/240.12 |
| 2012/0106636 | A1* | 5/2012 | Kim | H04N 19/46 375/240.12 |
| 2012/0269271 | A1* | 10/2012 | Chen | H04N 19/597 375/E7.243 |
| 2012/0314766 | A1* | 12/2012 | Chien | H04N 19/186 375/E7.243 |
| 2013/0022119 | A1 | 1/2013 | Chien et al. | |
| 2013/0051461 | A1* | 2/2013 | Chiu | H04N 19/129 375/240.12 |
| 2013/0051467 | A1* | 2/2013 | Zhou | H04N 19/105 375/240.13 |
| 2013/0101031 | A1* | 4/2013 | Van der Auwera | H04N 19/198 375/E7.193 |
| 2013/0182971 | A1* | 7/2013 | Leontaris | H04N 19/147 382/275 |
| 2013/0194386 | A1* | 8/2013 | Leontaris | H04N 19/147 348/43 |
| 2013/0272380 | A1 | 10/2013 | Chien et al. | |
| 2013/0301713 | A1* | 11/2013 | Cheung | H04N 19/593 375/240.12 |
| 2014/0072041 | A1* | 3/2014 | Seregin | H04N 19/176 375/240.13 |
| 2014/0092983 | A1 | 4/2014 | Joshi et al. | |
| 2014/0219349 | A1* | 8/2014 | Chien | H04N 19/105 375/240.13 |
| 2014/0254681 | A1 | 9/2014 | Aminlou et al. | |
| 2015/0003521 | A1* | 1/2015 | Thirumalai | H04N 19/597 375/240.08 |
| 2015/0016523 | A1 | 1/2015 | Puri et al. | |
| 2015/0237347 | A1* | 8/2015 | La | H04N 19/57 375/240.02 |
| 2016/0119643 | A1* | 4/2016 | An | H04N 19/139 348/43 |
| 2016/0255368 | A1* | 9/2016 | Heo | H04N 19/597 375/240.02 |
| 2016/0309156 | A1* | 10/2016 | Park | H04N 19/119 |
| 2016/0381384 | A1* | 12/2016 | Sugio | H04N 19/52 375/240.16 |
| 2017/0006303 | A1 | 1/2017 | Sethuraman et al. | |
| 2017/0054996 | A1* | 2/2017 | Xu | H04N 19/593 |
| 2017/0094283 | A1* | 3/2017 | Zhang | H04N 19/147 |
| 2017/0134732 | A1 | 5/2017 | Chen | |
| 2017/0150165 | A1* | 5/2017 | Na | H04N 19/30 |
| 2017/0164001 | A1* | 6/2017 | Choi | H04N 19/513 |
| 2017/0214912 | A1* | 7/2017 | Cote | H04N 19/11 |
| 2017/0214940 | A1* | 7/2017 | Chien | H04N 19/176 |
| 2017/0280160 | A1* | 9/2017 | Yoo | H04N 19/597 |
| 2017/0310973 | A1* | 10/2017 | Xu | H04N 19/176 |
| 2018/0077423 | A1* | 3/2018 | Xu | H04N 19/13 |
| 2018/0184082 | A1* | 6/2018 | Yoo | H04N 19/176 |
| 2018/0234679 | A1* | 8/2018 | Heo | H04N 19/176 |
| 2018/0242012 | A1* | 8/2018 | Chiu | H04N 19/51 |
| 2018/0249156 | A1* | 8/2018 | Heo | H04N 19/70 |
| 2018/0309987 | A1 | 10/2018 | Kim et al. | |
| 2018/0367793 | A1* | 12/2018 | Park | H04N 19/11 |
| 2019/0132609 | A1* | 5/2019 | Sugio | H04N 19/503 |
| 2019/0273926 | A1* | 9/2019 | Heo | H04N 19/105 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Sullivan J., et al., "Overview of the High Efficiency Video Coding (HEVC) Standard," IEEE Transactions on Circuits and Systems for Video Technology, vol. 22, No. 12, Dec. 2012, pp. 1649-1668.
Chen J., et al., "Algorithm Description of Joint Exploration Test Model 5," Document: JVET-E1001_v2, Joint Video Exploration Team (JVET) of ITU-T SG 16 WP 3 and ISO/IEC JTC 1/SC 29/WG 11, 5th Meeting: Geneva, CH, Jan. 12-20, 2017, 44 Pages.
An J., et al., "Block partitioning structure for next generation video coding", International Telecommunication Union, COM16-C966, Sep. 2015, 8 Pages.
International Search Report and Written Opinion—PCT/US2018/023465—ISA/EPO—dated Jun. 19, 2018, 17 pp.
Xiu X., et al., "EE8-related: Decoupling decoder-side intra mode derivation from entropy decoding," 4. JVET Meeting; Oct. 15, 2016-Oct. 21, 2016; Chengdu, CN (The Joint Video Exploration Team of ISO/IEC JTC1/SC29/WG11 and ITU-T SG.16); URL: http://phenix.int-evry.fr/jvet/, No. JVET-D0098-V3, Oct. 13, 2016 (Oct. 13, 2016), XP030150339, 4 pp.

* cited by examiner

INTRA-PREDICTION MODE PROPAGATION

This application claims the benefit of U.S. Provisional Patent Application No. 62/475,149, filed Mar. 22, 2017, the entire content of which is incorporated by reference herein.

TECHNICAL FIELD

This disclosure relates to video encoding and video decoding.

BACKGROUND

Digital video capabilities may be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC or H.265) standard, and extensions of such standards. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

This disclosure describes techniques for encoding and decoding video data. In particular, this disclosure describes techniques related to intra-prediction, techniques for the propagation of intra-coding modes to inter-coded blocks, and/or techniques for coding video blocks. In examples of the disclosure, a video encoder and a video decoder may be configured to associate an intra-prediction mode with blocks of video data that are otherwise coded using an inter-prediction mode. The associated intra-prediction mode may be copied and/or determined from the intra-prediction mode associated with another block of video data. The other block of video data may be a collocated block in another frame, a reference block of video data in another frame, or another block of video data in the same frame.

In some examples, the video encoder and video decoder may use the associated intra-prediction modes for inter-predicted blocks to predict intra-prediction modes for other blocks of video data. In other examples, the video encoder and video decoder may decode a block of data using both an inter-prediction mode and an intra-prediction mode. The two predictions may be combined in a weighted to sum to determine the final prediction for the block.

In one example, this disclosure describes a method of decoding video data comprising receiving a first block of video data encoded using an inter-prediction mode, associating a first intra-prediction mode with the first block of video data, wherein the first intra-prediction mode is associated with a second block of video data, and determining a second intra-prediction mode for a neighbor block of video data based at least in part on the first intra-prediction mode.

In another example, this disclosure describes an apparatus configured to decode video data, the apparatus comprising a memory configured to store a first block of video data and one or more processors in communication with the memory, the one or more processors configured to receive the first block of video data encoded using an inter-prediction mode, associate a first intra-prediction mode with the first block of video data, wherein the first intra-prediction mode is associated with a second block of video data, and determine a second intra-prediction mode for a neighbor block of video data based at least in part on the first intra-prediction mode.

In another example, this disclosure describes an apparatus configured to decode video data, the apparatus comprising means for receiving a first block of video data encoded using an inter-prediction mode, means for associating a first intra-prediction mode with the first block of video data, wherein the first intra-prediction mode is associated with a second block of video data, and means for determining a second intra-prediction mode for a neighbor block of video data based at least in part on the first intra-prediction mode.

In another example, this disclosure describes a computer-readable storage medium storing instructions that, when executed, causes one or more processors of a device configured to decode video data to receive the first block of video data encoded using an inter-prediction mode, associate a first intra-prediction mode with the first block of video data, wherein the first intra-prediction mode is associated with a second block of video data, and determine a second intra-prediction mode for a neighbor block of video data based at least in part on the first intra-prediction mode.

In another example, this disclosure describes a method of encoding video data, the method comprising encoding a first block of video data using an inter-prediction mode, associating a first intra-prediction mode with the first block of video data, wherein the first intra-prediction mode is associated with a second block of video data, and determining a second intra-prediction mode for a neighbor block of video data based at least in part on the first intra-prediction mode.

In another example, this disclosure describes an apparatus configured to encode video data, the apparatus comprising a memory configured to store a first block of video data and one or more processors in communication with the memory, the one or more processors configured to encode the first block of video data using an inter-prediction mode, associate a first intra-prediction mode with the first block of video data, wherein the first intra-prediction mode is associated with a second block of video data, and determine a second intra-prediction mode for a neighbor block of video data based at least in part on the first intra-prediction mode.

The example techniques of this disclosure for associating an intra-prediction mode with the first block of video data, wherein the intra-prediction mode is associated with a second block of video data, may be used in conjunction with one or more other techniques described in this disclosure in any combination. For example, the techniques of this disclosure for associating an intra-prediction mode with the first block of video data may be used in conjunction with techniques for determining an intra-prediction mode for another block of video data, determining an intra-prediction mode for another block of video data using a most probable mode list, techniques for performing a combined prediction, and techniques for associate an intra-prediction mode with a subblock of video data.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
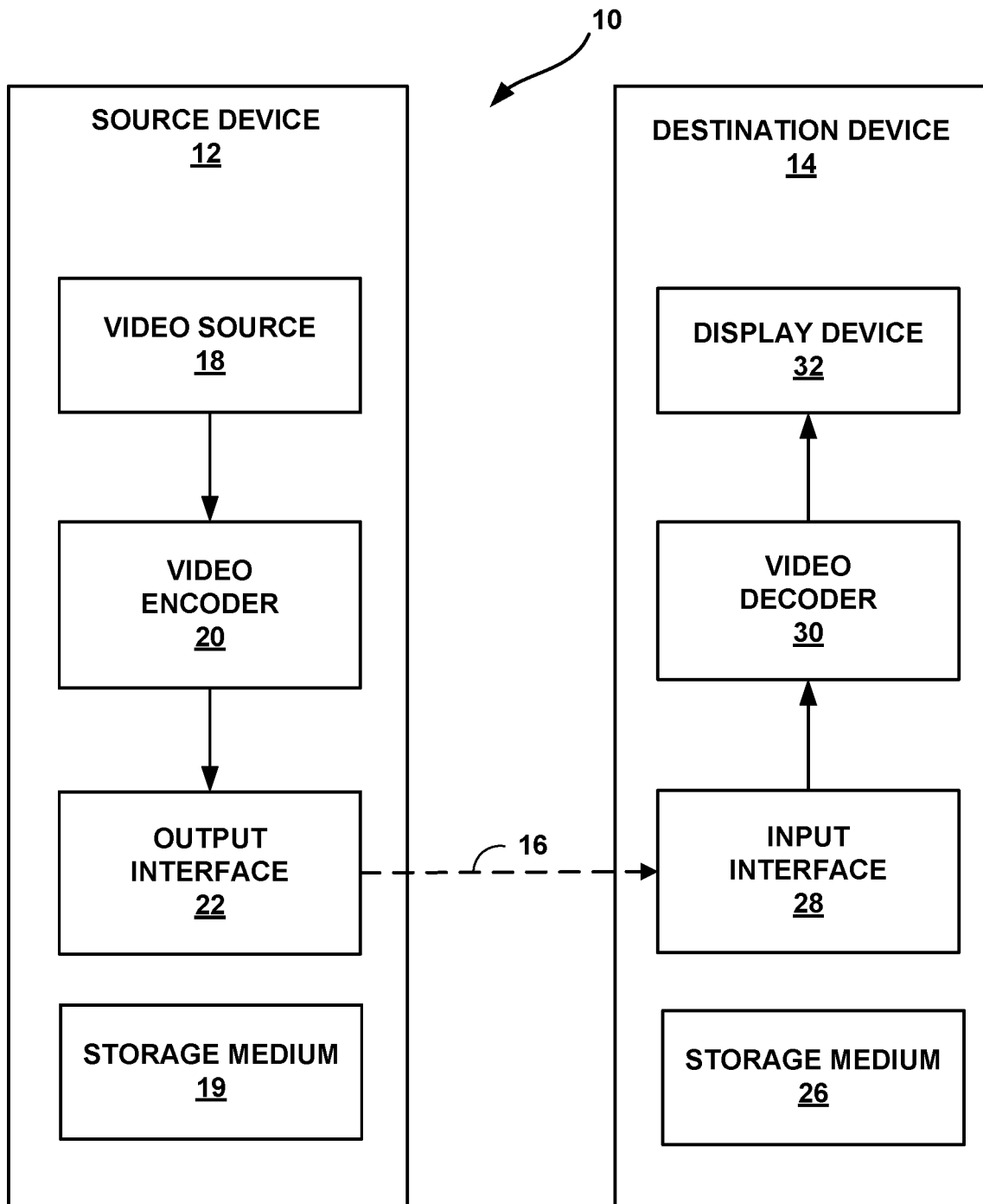
FIG. 1 is a block diagram illustrating an example video encoding and decoding system configured to implement techniques of the disclosure.

This disclosure describes techniques for encoding and decoding video data. In particular, this disclosure describes techniques related to intra-prediction, propagation of the intra-coding mode to inter-coded blocks, coding video blocks, and/or determining coding modes based on propagated intra-coding modes. In general, if a video coding device, such as a video decoder, receives a video block that may have been encoded using an intra-coding mode, then the video coding device may decode the received video block using the intra-coding mode. However, if the received video block is an inter-block, the video coding device may derive an intra-prediction mode and associate the intra-coding mode with the inter-coded block. The associated intra-prediction mode may be copied and/or determined from the intra-prediction mode associated with another block of video data. The other block of video data may be a collocated block in another frame, a reference block of video data in another frame, or another block of video data in the same frame.

In some examples, a video encoder and video decoder may use the associated intra-prediction modes for inter-predicted blocks to predict intra-prediction modes for other blocks of video data. Inter-predicted blocks refer to blocks that encoded or decoded based on blocks in another picture than the inter-predicted blocks, and intra-predicted blocks refer to blocks that encoded or decoded based on sample values of blocks in the same picture as the intra-predicted blocks. In other examples, the video encoder and video decoder may decode a block of data using both an inter-prediction mode and an intra-prediction mode. The two predictions may be combined in a weighted to sum to determine the final prediction for the block.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), ITU-T H.265 (also known as High Efficiency Video Coding (HEVC)), including extensions such as Scalable Video Coding (SVC), Multi-view Video Coding (MVC), the Joint Exploratory Model (JEM), and Screen content coding (SCC). Other video coding standards include future video coding standards, such as Joint Video Exploration Team (WET) test model, which is the development activity beyond HEVC. Video coding standards also include proprietary video codecs, such Google VP8, VP9, VP10, and video codecs developed by other organizations, for example, the Alliance for Open Media.

Various techniques in this disclosure may be described with reference to a video coder, which is intended to be a generic term that can refer to either a video encoder or a video decoder. Unless explicitly stated otherwise, it should be assumed that techniques described with respect to a video encoder or a video decoder can also be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices. In this disclosure, the terms picture and frame may be used interchangeably.

FIG. 1 is a block diagram illustrating an example video encoding and decoding system 10 that may be configured to perform the techniques of this disclosure. As shown in FIG. 1, system 10 includes source device 12 that provides encoded video data to be decoded at a later time by destination device 14. In particular, source device 12 provides the video data to destination device 14 via computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes video source 18, storage media 19 configured to store video data, video encoder 20, and output interface 22. Destination device 14 includes input interface 28, storage media 26 configured to store encoded video data, video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device 32.

The illustrated system 10 of FIG. 1 is merely one example. Techniques for processing and/or coding (e.g., encoding and/or decoding) video data may be performed by any digital video encoding and/or decoding device. Although the techniques of this disclosure are generally performed by a video encoding device and/or video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general and may be applied to wireless and/or wired applications. In each case, the captured, pre-captured, or computer-generated video may be encoded by video encoder 20. Output interface 22 may output the encoded video information (e.g., a bitstream of encoded video data) to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques described in this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 26 may store encoded video data received by input interface 28. Display device 32 displays the decoded video data to a user and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable video encoder and/or video decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined CODEC in a respective device.

In some examples, video encoder 20 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG).

In other examples, video encoder 20 and video decoder 30 may be configured to operate according to other video coding techniques and/or standards, including new video coding techniques being explored by the Joint Video Exploration Team (WET).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (e.g., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture (e.g., an encoded video bitstream), video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an NxN block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quadtree partitioning on the coding tree blocks of a CTU to divide the coding tree blocks into coding blocks, hence the name "coding tree units." A coding block is an NxN block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra-prediction or inter-prediction to generate the predictive blocks for a PU. If video encoder 20 uses intra-prediction to generate the predictive blocks of a PU, video encoder 20 may generate the predictive blocks of the PU based on decoded samples of the picture that includes the PU.

After video encoder 20 generates predictive blocks (e.g., luma, Cb, and Cr predictive blocks) for one or more PUs of a CU, video encoder 20 may generate one or more residual blocks for the CU. As one example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. In one example of chroma prediction, each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block. However, it should be understood that other techniques for chroma prediction may be used.

Furthermore, video encoder 20 may use quadtree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform context-adaptive binary arithmetic coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

Video decoder 30 may receive an encoded video bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some example video codec frameworks, such as the quadtree partitioning framework of HEVC, partitioning of video data into blocks for the color components (e.g., luma blocks and chroma blocks) is performed jointly. That is, in some examples, luma blocks and chroma blocks are partitioned in the same manner such that no more than one luma block corresponds to a chroma block in a particular location within a picture.

A quadtree plus binary tree (QTBT) partition structure is currently being studied by the Joint Video Exploration Team (WET). In J. An et al., "Block partitioning structure for next generation video coding", International Telecommunication Union, COM16-C966, September 2015 (hereinafter, "VCEG proposal COM16-C966"), QTBT partitioning techniques were described for future video coding standard beyond HEVC. Simulations have shown that the proposed QTBT structure may be more efficient than the quadtree structure used in HEVC.

In the QTBT structure described in VCEG proposal COM16-C966, a CTB is first partitioned using quadtree partitioning techniques, where the quadtree splitting of one node may be iterated until the node reaches the minimum allowed quadtree leaf node size. The minimum allowed quadtree leaf node size may be indicated to video decoder 30 by the value of the syntax element MinQTSize. If the quadtree leaf node size is not larger than the maximum allowed binary tree root node size (e.g., as denoted by a syntax element MaxBTSize), the quadtree leaf node may be further partitioned using binary tree partitioning. The binary tree partitioning of one node may be iterated until the node reaches the minimum allowed binary tree leaf node size (e.g., as denoted by a syntax element MinBTSize) or the maximum allowed binary tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra-prediction, inter-prediction, etc.) and transform without any further partitioning. In general, according to QTBT techniques, there are two splitting types for binary tree splitting: symmetric horizontal splitting and symmetric vertical splitting. In each case, a block is split by dividing the block down the middle, either horizontally or vertically. This differs from quadtree partitioning, which divides a block into four blocks.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBTSize (for both width and height) is set as 4, and the MaxBTDepth is set as 4. Quadtree partitioning is applied to the CTU first to generate quadtree leaf nodes. The quadtree leaf nodes may have a size from 16×16 (i.e., the MinQTSize is 16×16) to 128×128 (i.e., the CTU size). According to one example of QTBT partitioning, if the leaf quadtree node is 128×128, the leaf quadtree node cannot be further split by the binary tree, since the size of the leaf quadtree node exceeds the MaxBTSize (i.e., 64×64). Otherwise, the leaf quadtree node is further partitioned by the binary tree. Therefore, the quadtree leaf node is also the root node for the binary tree and has the binary tree depth as 0. The binary tree depth reaching MaxBTDepth (e.g., 4) implies that there is no further splitting. The binary tree node having a width equal to the MinBTSize (e.g., 4) implies that there is no further horizontal splitting. Similarly, the binary tree node having a height equal to MinBTSize implies no further vertical splitting. The leaf nodes of the binary tree (CUs) are further processed (e.g., by performing a prediction process and a transform process) without any further partitioning.

In accordance with the techniques of this disclosure, as will be explained in more detail below, a video coding device, such as video encoder 20, may encode a first block of video data using an inter-prediction mode, associate a first intra-prediction mode with the first block of video data, wherein the first intra-prediction mode is associated with a second block of video data, and determine a second intra-prediction mode for a neighbor block of video data based at least in part on the first intra-prediction mode. Although the first block is inter-predicted, video encoder 20 associates an intra-prediction mode (e.g., a first intra-prediction mode) with this inter-predicted first block. Video encoder 20 may determine an intra-prediction mode (e.g., second intra-prediction mode) for a neighboring block (e.g., block neighboring the first block) based on the intra-prediction mode associated with the first block. In this way, bit savings may be achieved because intra-prediction mode information for the neighboring block does not need to be signaled. Also, because the inter-predicted block now has an associated intra-prediction mode, more intra-prediction modes may be available for determining intra-prediction modes of neighboring blocks.

Further in accordance with the techniques of this disclosure, a video coding device, such as video decoder 30, may receive a first block of video data encoded using an inter-prediction mode, associate a first intra-prediction mode with the first block of video data, wherein the first intra-prediction mode is associated with a second block of video data, and determine a second intra-prediction mode for a neighbor block of video data based at least in part on the first intra-prediction mode. Video decoder 30 may determine an intra-prediction mode (e.g., second intra-prediction mode) for a neighboring block (e.g., block neighboring the first block) based on the intra-prediction mode associated with the first block. In this way, bit savings may be achieved because intra-prediction mode information for the neighboring block does not need to be received and parsed by video decoder 30. Also, because the inter-predicted block now has an associated intra-prediction mode, more intra-prediction modes may be available for determining intra-prediction modes of neighboring blocks, thus improving the accuracy of intra-prediction mode determination.

Figure 2:
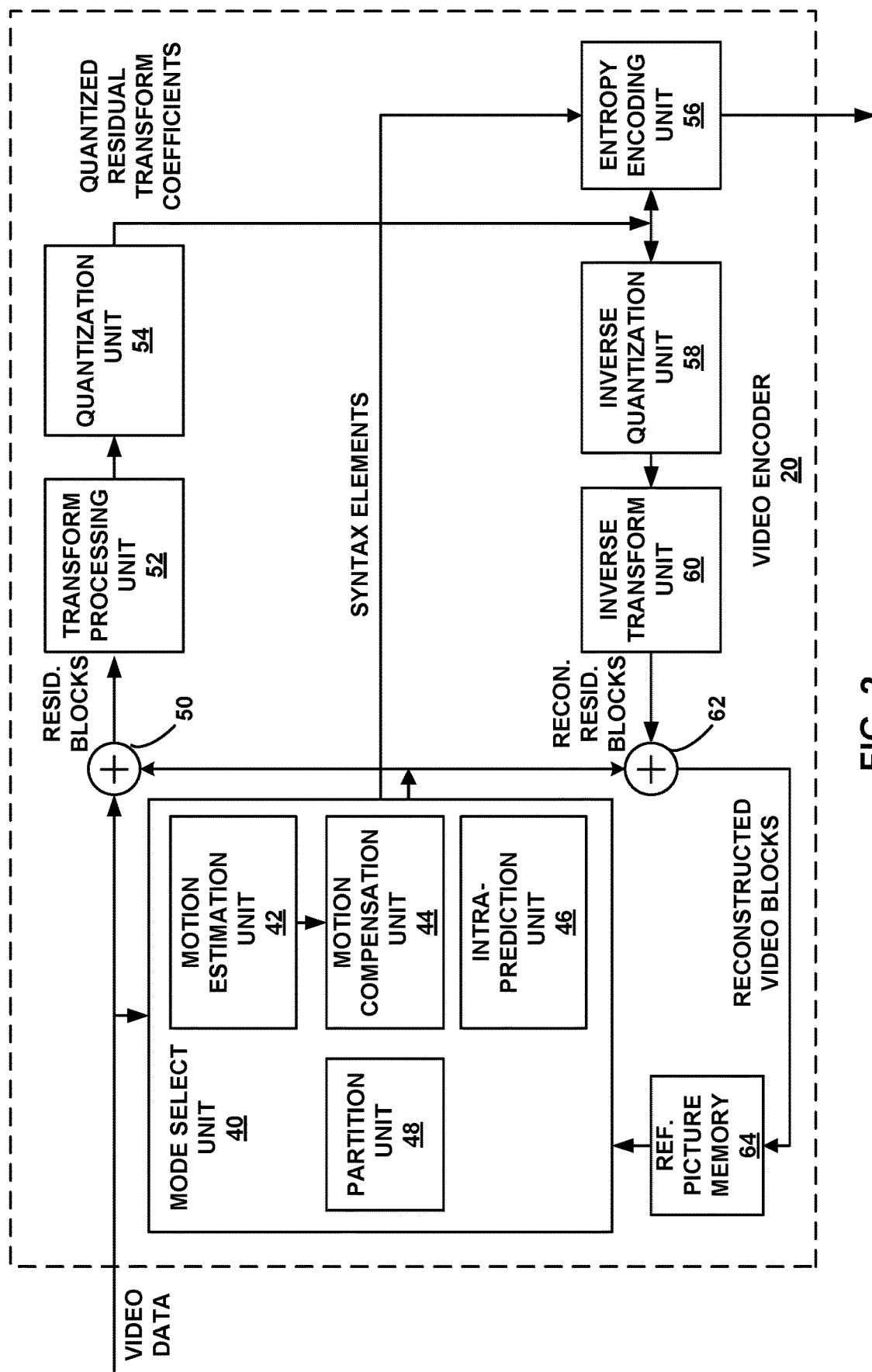
FIG. 2 is a block diagram illustrating an example of a video encoder configured to implement techniques of the disclosure.

FIG. 2 is a block diagram illustrating an example of video encoder 20 configured to implement techniques of the disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56. Mode select unit 40, or another component of video encoder 20, may be configured to perform the techniques of this disclosure for associating an intra-prediction mode with an inter-predicted block.

Motion estimation unit 42 and motion compensation unit 44 may be highly integrated but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
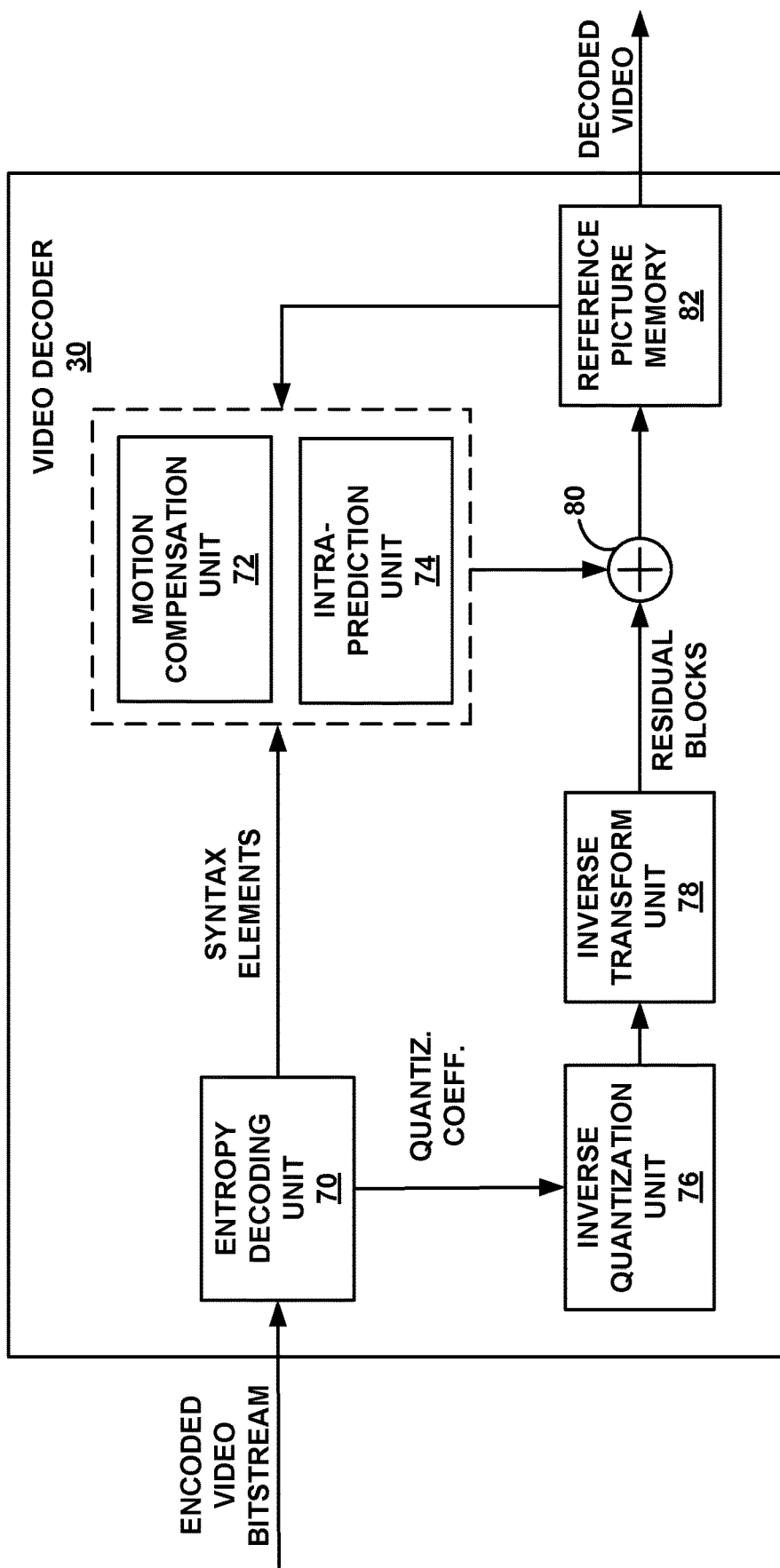
FIG. 3 is a block diagram illustrating an example of a video decoder configured to implement techniques of the disclosure.

FIG. 3 is a block diagram illustrating an example of video decoder 30 configured to implement techniques of the disclosure. In the example of FIG. 3, video decoder 30 includes an entropy decoding unit 70, motion compensation unit 72, intra-prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30, e.g., using motion compensation unit 72 or another component of video decoder 30, may be configured to perform the techniques of this disclosure for associating an intra-prediction mode with an inter-predicted block.

Figure 4:
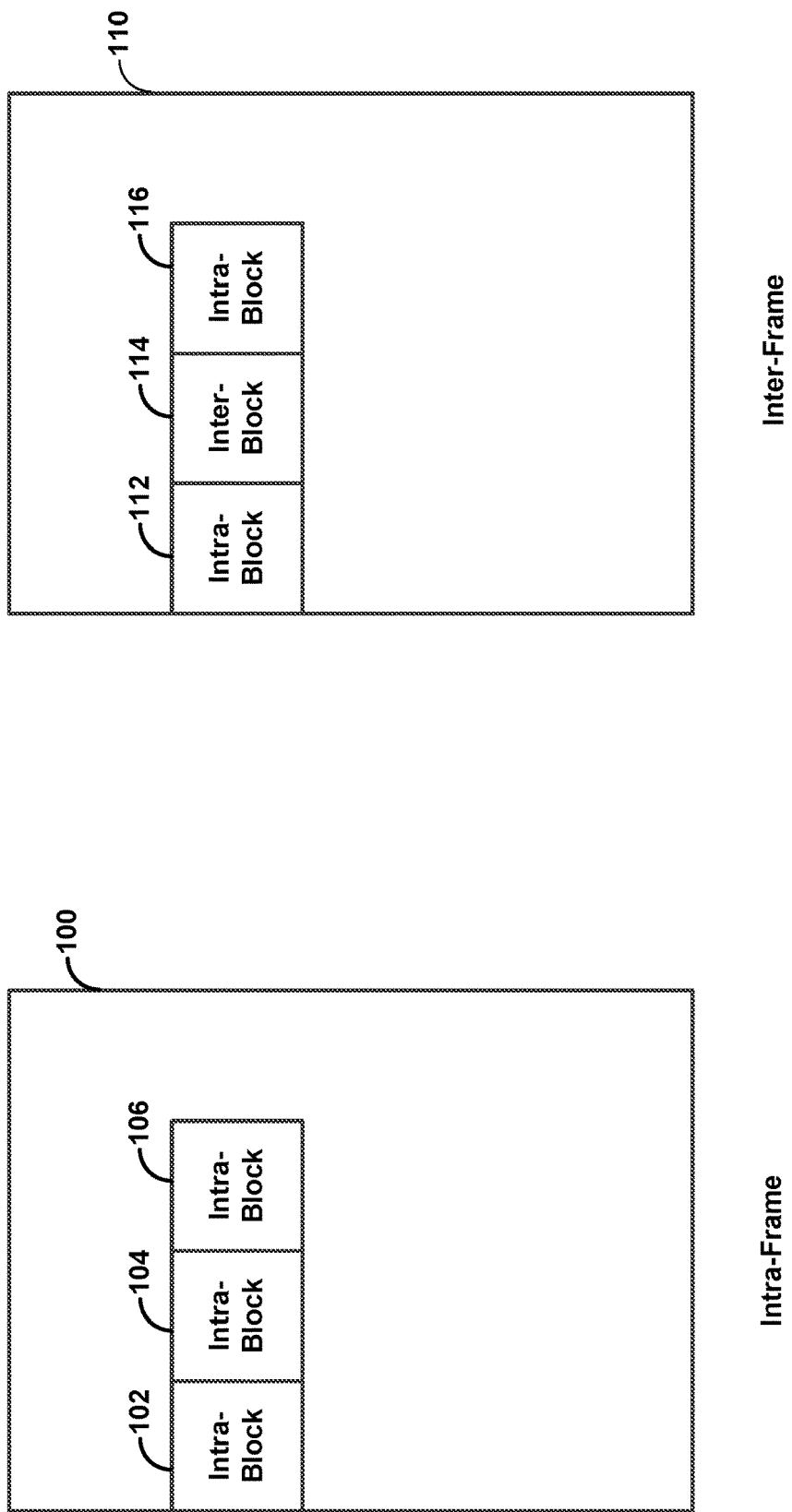
FIG. 4 is a conceptual diagram illustrating example types of blocks and slices in video coding, in accordance with the techniques of this disclosure.

FIG. 4 is a conceptual diagram illustrating example types of blocks and slices in video coding, in accordance with the techniques of this disclosure. In some example video coding standards, such as HEVC, there may be two kinds of frames (or slices, which are portions of frames): inter-frames and intra-frames. In an intra-frame or intra-slice, video encoder 20 and video decoder 30 may only code a block as an intra-block (i.e., with a particular intra-prediction mode) based on samples within the same picture as the intra-block. Conversely, in an inter-frame, video encoder 20 and video decoder 30 may code a block as an intra-block or an inter-block (i.e., using a particular intra-prediction mode or a particular inter-prediction mode). In inter-prediction mode, the inter-block is predicted based on a block in a different picture than the inter-block. FIG. 4 shows examples of an intra-frame 100 and an inter-frame 110. Intra-frame 100 includes only intra-blocks 102, 104, and 106. However, inter-frame 110 may include intra-block 112 and intra-block 116, as well as inter-block 114.

In some examples, although inter-block 114 is inter-predicted, video encoder 20 and video decoder 30 may associate an intra-prediction mode to inter-block 114. Video encoder 20 and video decoder 30 may determine an intra-prediction mode for another block based on the intra-prediction mode associated to inter-block 114. The intra-prediction mode associated with inter-block 114 may be an intra-prediction mode of another block (e.g., collocated block in another picture, reference block in another picture, or block in the same picture). For example, video encoder 20 and video decoder 30 may determine the intra-prediction mode of this other block to determine the intra-prediction mode that is to be associated with inter-block 114.

Figure 5:
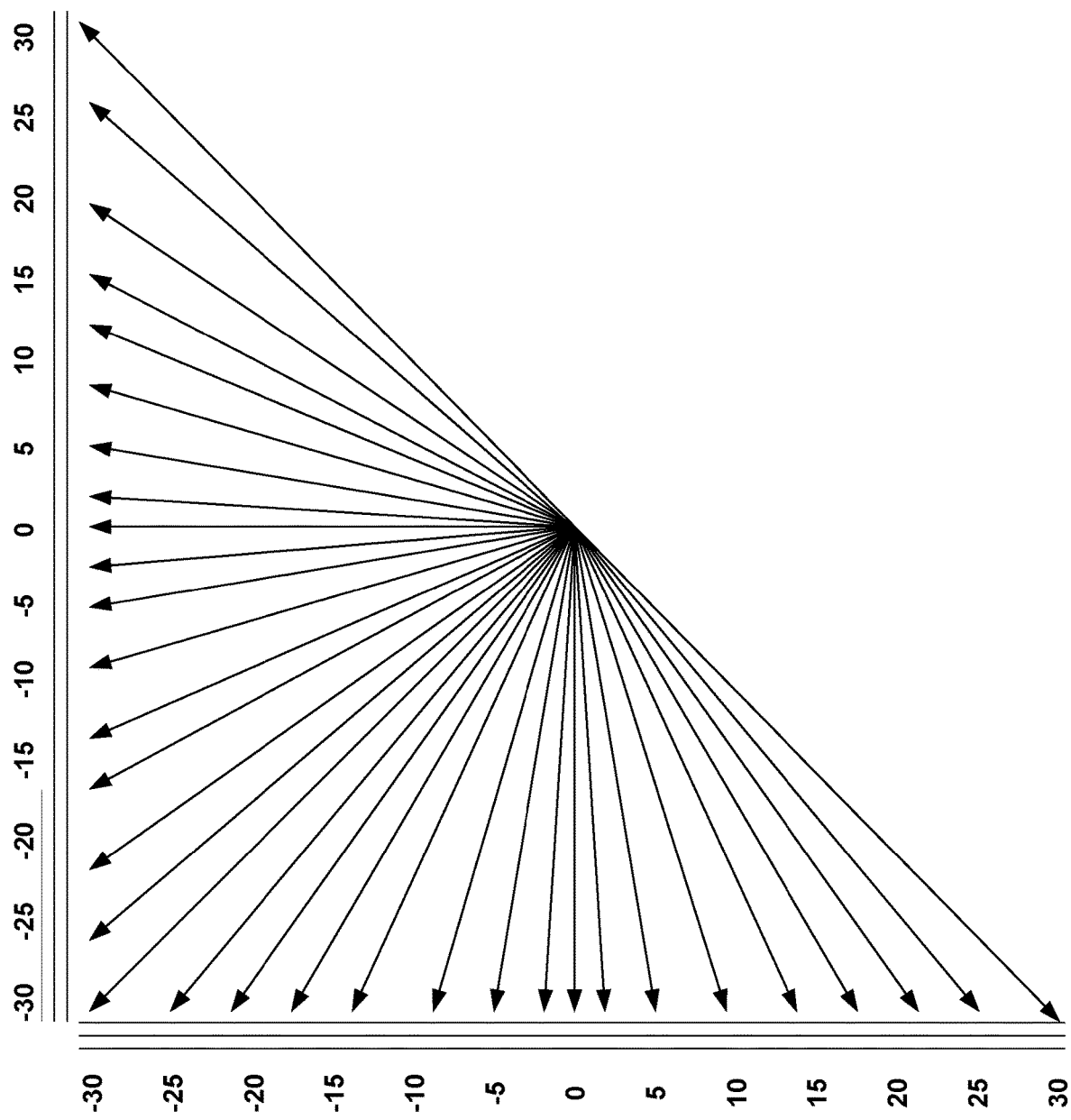
FIG. 5 is a conceptual diagram illustrating example directional intra-prediction modes in accordance with the techniques of this disclosure.

FIG. 5 is a conceptual diagram illustrating example directional intra-prediction modes in HEVC, that may be used in one example of this disclosure. Video encoder 20 and video decoder 30 may apply one of the intra-prediction modes shown in FIG. 5 to code an intra-block. Of course, other intra-prediction modes may be used. When coding a current block with an intra-prediction mode, video encoder 20 and video decoder 30 may be configured to predict the current block using neighboring pixels in the current frame. When coding a current block with an inter-prediction mode, video encoder 20 and video decoder 30 may be configured predict the current block using pixels in previously encoded/decoded frames, called "reference frames" or "reference pictures." In HEVC, there are 35 intra-prediction modes representing different prediction directions, as shown in FIG. 5. In one example of JEM, the number of intra-prediction modes is increased to 67.

Figure 6:
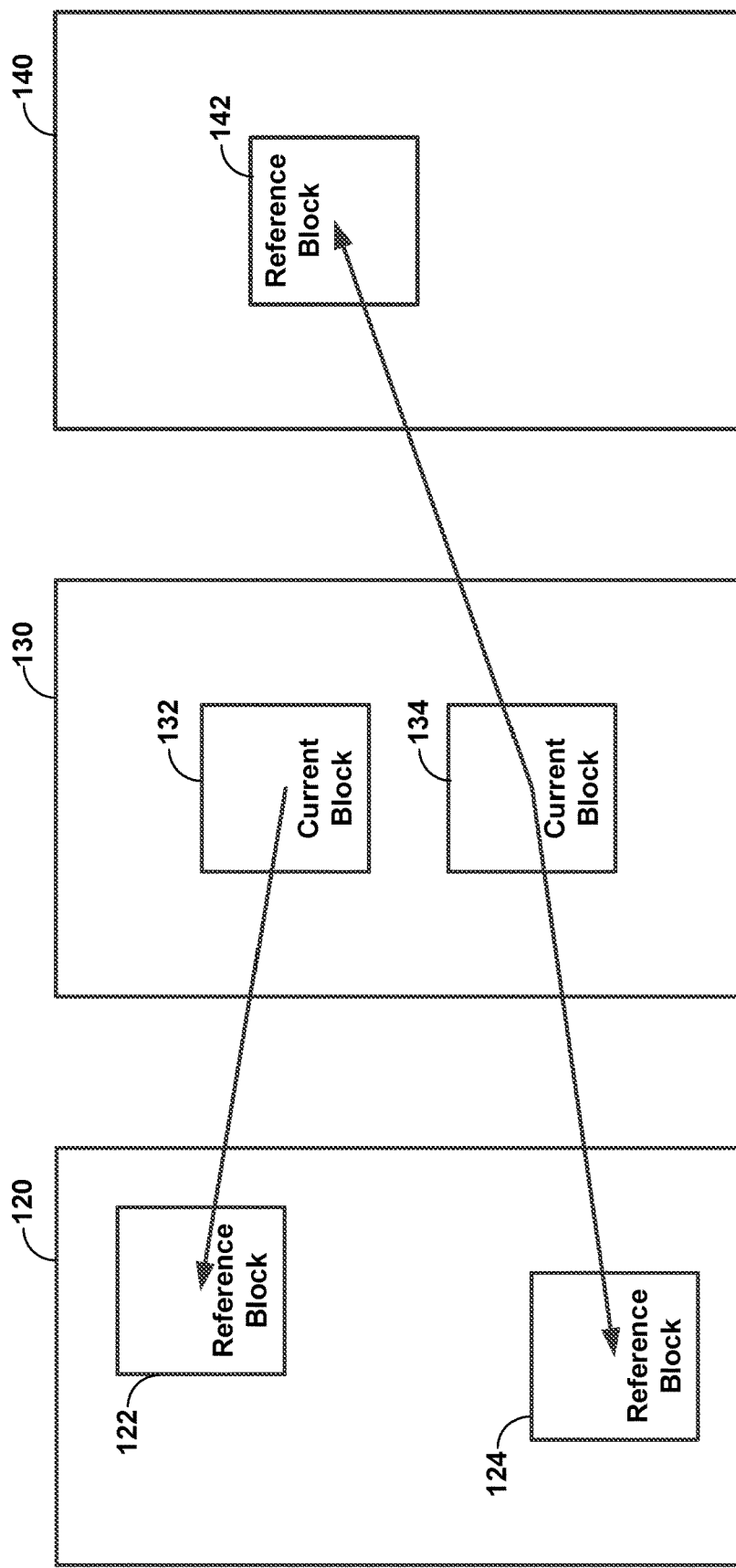
FIG. 6 is a conceptual diagram illustrating example inter-prediction techniques in accordance with the techniques of this disclosure.

FIG. 6 is a conceptual diagram illustrating example inter-prediction techniques in HEVC, in accordance with the techniques of this disclosure. In examples of HEVC, each intra-coded block is associated with intra-prediction mode information (e.g., an index indicating the intra-prediction mode used). For inter-prediction, motion compensation (MC) may be used from one reference block (uni-prediction) or two reference blocks (bi-prediction) in reference frames as shown in FIG. 6. For example, for uni-prediction, video encoder 20 and video decoder 30 may code current block 132 in picture 130 with reference to reference block 122 in picture 120. For bi-prediction, video encoder 20 and video decoder 30 may code current block 134 in picture 130 with reference to both reference block 124 in picture 120 and reference block 142 in picture 140. Each inter-coded block is associated with its own motion information, including reference frame indices and motion vectors (MV).

Figure 7:
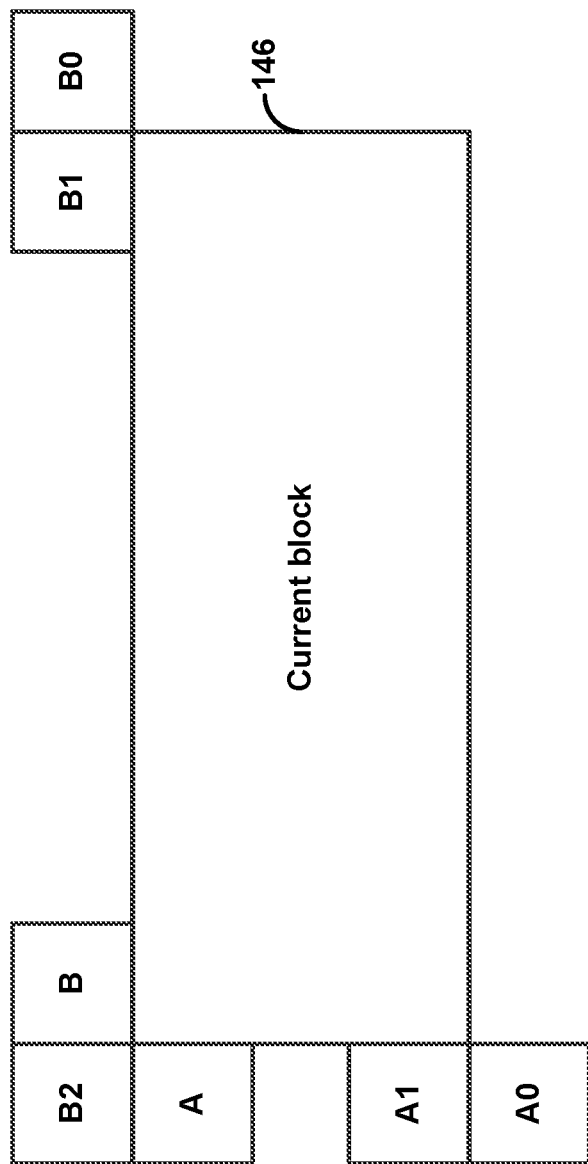
FIG. 7 is a conceptual diagram illustrating example neighboring blocks of a current block in video coding.

FIG. 7 is a conceptual diagram illustrating example neighboring blocks of a current block 146, in accordance with the techniques of this disclosure. To code an intra-prediction mode for current block 146, intra-prediction modes of neighboring blocks may be used as prediction modes for the current block 146. That is, in some examples, video encoder 20 and video decoder 30 may use the intra-prediction modes of neighboring blocks to determine the intra-prediction mode for block 146. FIG. 7 shows exemplary neighboring blocks A, A1, A0, B, B2, B1, and B0. In HEVC, video encoder 20 and video decoder 30 may be configured to use the intra-prediction modes of one of neighboring blocks A and B as the intra-prediction mode for current block 146.

In examples of JEM, more neighboring blocks (A0, A1, B0, B1, B2) may be considered when determining the intra-prediction mode for current block 146. If a neighboring block does not exist (e.g., the current block is at a boundary of a frame), or a neighboring block is not intra-coded (e.g., the current frame is an inter-frame but the current block is intra-coded and a neighboring block is inter-coded), video encoder 20 and video decoder 30 may be configured to mark such a neighboring block as "unavailable" and its intra-prediction mode may not be used to predict the intra-prediction mode of the current block. This is because such a block does not have an associated intra-prediction mode.

In order to improve the coding performance of inter-frames, the techniques of this disclosure include using intra-prediction mode propagation when coding blocks in inter-frames. With intra-mode propagation, video encoder 20 and video decoder 30 may be configured to associate an intra-prediction mode with blocks of video data, regardless of whether the block is intra-coded or inter-coded. For an intra-coded block (i.e., a block encoded using an intra-prediction technique), the intra-prediction mode may be signaled from video encoder 20 to the video decoder 30 in an encoded video bitstream, as in HEVC or JEM. Video decoder 30 may decode the intra-coded block using the signalled intra-prediction mode.

For an inter-coded block (i.e., a block encoded using an inter-prediction technique), video encoder 20 and video decoder 30 may derive, in the same manner, an intra-prediction mode for the inter-coded block using one or more intra-prediction mode propagation techniques described below. In general, when performing intra-prediction mode propagation, video encoder 20 and video decoder 30 may be configured to associate an intra-prediction mode with blocks of video data coded using an inter-prediction mode based on one or more intra-prediction modes associated with one or more other blocks of video data. The one or more other blocks of video data may, of course be intra-coded blocks, which inherently have associated intra-prediction modes. In addition, the one or more other blocks may be inter-coded blocks. These inter-coded blocks would also have associated intra-prediction modes, as video encoder 20 and video decoder 30 would have already applied the intra-prediction mode propagation techniques of this disclosure to these blocks. As video sequences start from an intra-frame, where all blocks are intra-coded, video encoder 20 and video decoder 30 may, in one example, ensure that all blocks, whether intra-coded and inter-coded, have an associated intra-prediction mode.

Using the techniques of this disclosure, more blocks of video data may have associated intra-prediction modes, regardless of the actual mode used to code the block. It should be understood that video decoder 30 may still decode an inter-coded block using an inter-prediction mode when associating an intra-prediction mode with the inter-coded blocks using the techniques of this disclosure. As will be discussed in more detail below, the intra-prediction modes associated with the inter-coded blocks may be used to improve coding performance, for example, when determining what intra-prediction mode to use for a particular block. Hence, the association of an intra-prediction mode to an inter-precited block should not be interpreted to mean that the inter-precited block must now be decoded using intra-prediction. Rather, the associated intra-prediction mode is used for coding or bandwidth efficiency for determining intra-prediction mode of another block.

In one example of the disclosure, video encoder 20 and video decoder 30 may be configured to determine an intra-prediction mode for an inter-predicted current block from the intra-prediction mode of a collocated block in a different frame. In the context of this disclosure, a collocated block is a block having the same position as another block, but in a different frame. As different frames have different partitioning structures, collocated blocks may not overlap exactly. Accordingly, a collocated block may be determined as a block of video data being at the same pixel position as one predefined point on the current block (e.g., the upper left corner of the current block). Any predefined point on the current block may be used.

Figure 8:
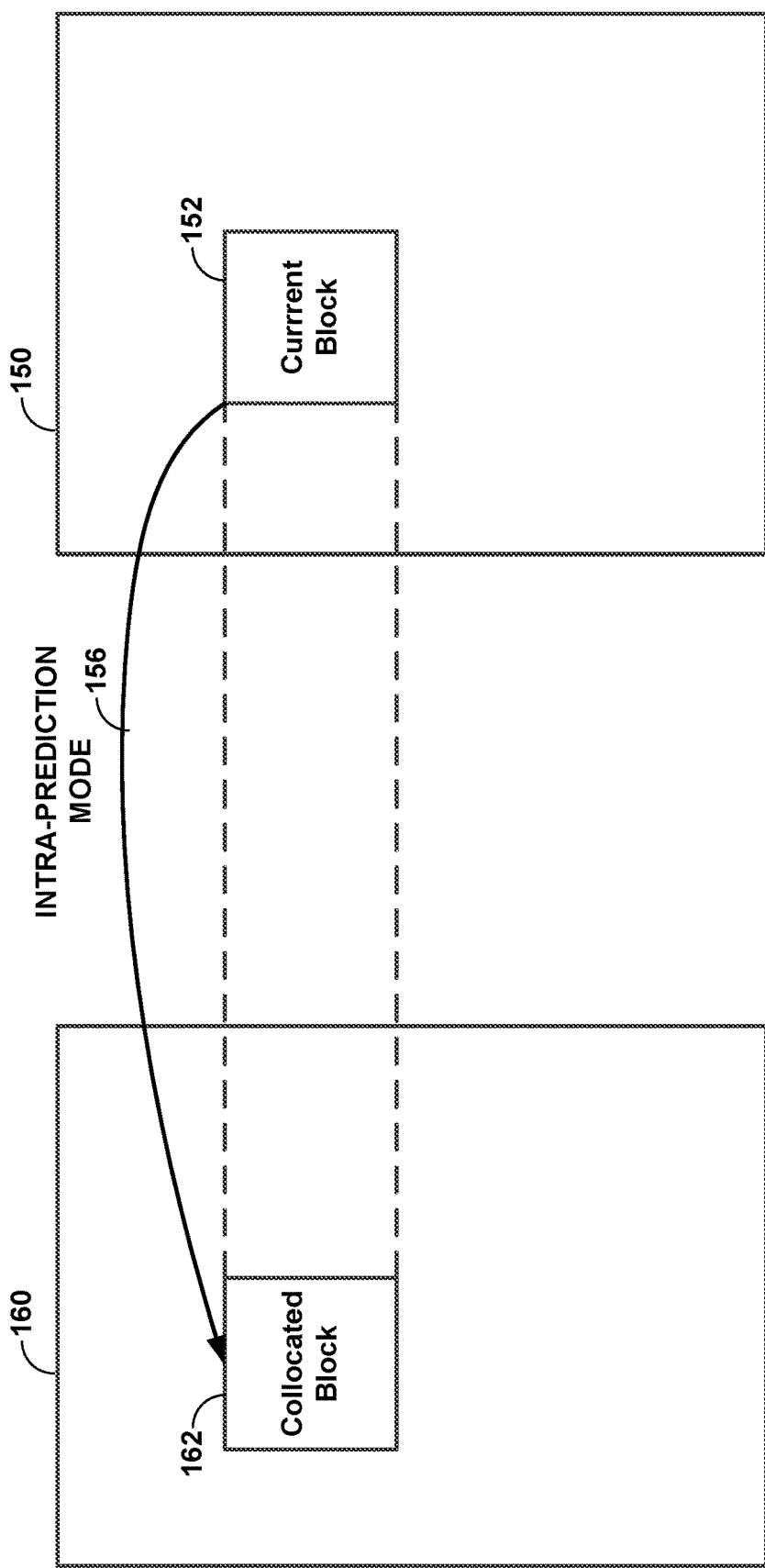
FIG. 8 is a conceptual diagram illustrating an example of obtaining an intra-prediction mode from a collocated block.

FIG. 8 is a conceptual diagram illustrating an example of determining an intra-prediction mode from a collocated block, in accordance with the techniques of this disclosure. In FIG. 8, current block 152 in picture 150 is coded using inter-prediction. In accordance with the techniques of this disclosure, video encoder 20 and video decoder 30 may be configured to determine an intra-prediction mode for current block 152 by copying intra-prediction mode 156 from collocated block 162 in picture 160. That is, intra-prediction mode 156 of collocated block 162 in frame 160 may be treated as the intra-prediction mode of the current inter-coded block 152.

In one example, the position of collocated block 162 in frame 160 may be located in the same way as done in temporal motion vector prediction (TMVP) in HEVC and JEM, except that the collocated frame is allowed to be an intra-frame. The collocated picture may be selected from the reference pictures of the current picture. In one example, the reference picture with reference index 0 in the reference picture list 0 (or 1) is used as collocated picture (e.g., picture 160). In some examples, the selection of collocated picture 160 may be signaled from video encoder 20 to video decoder 30, or the selection of collocated picture 160 may be derived implicitly at video decoder 30.

Collocated block 162 in collocated frame 160 may be intra-coded, or collocated block 162 may be inter-coded. In the former case, the intra-prediction mode of collocated block 162 is signaled from video encoder 20 to video decoder 30 when coding collocated block 162. In the latter case, the intra-prediction mode of collocated block 162 is also derived, for example, using the intra-prediction mode propagation techniques of this disclosure.

Figure 9:
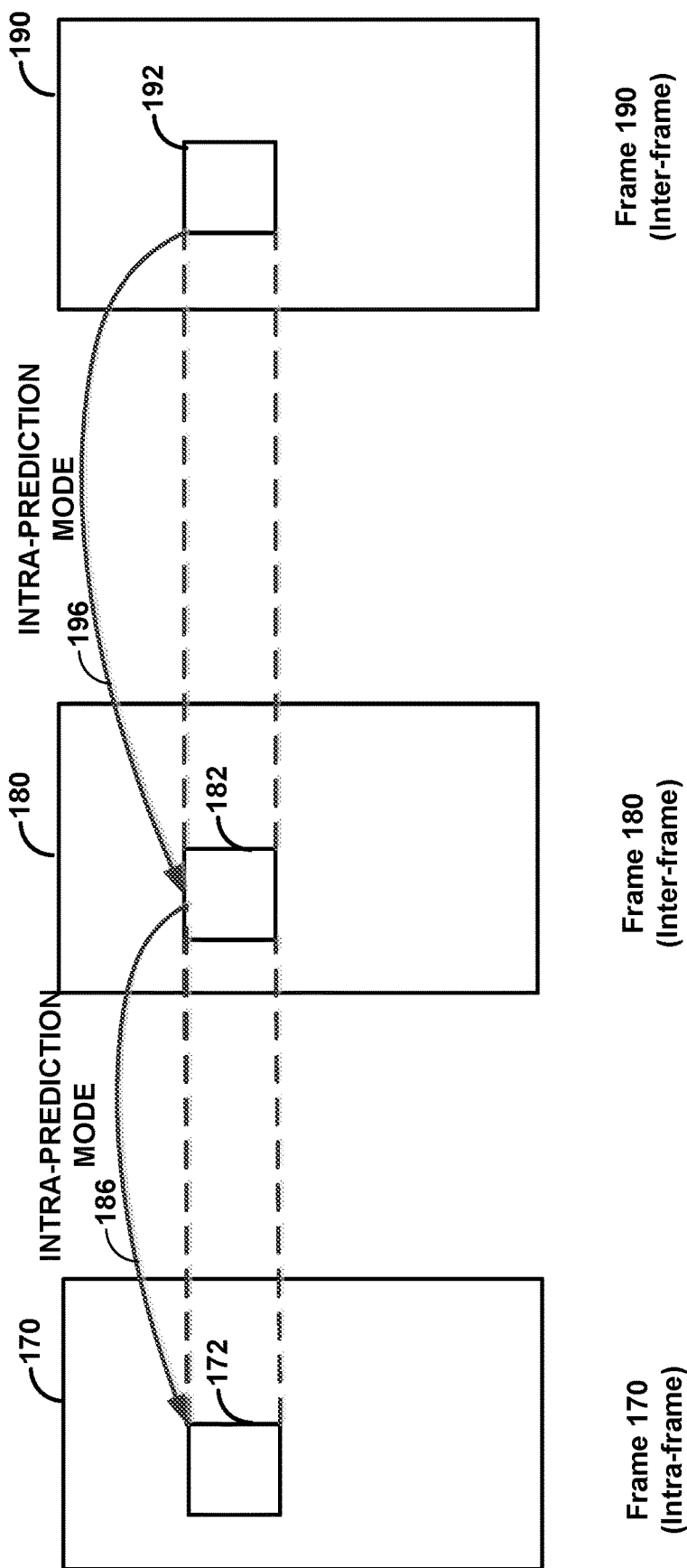
FIG. 9 is a conceptual diagram illustrating an example of obtaining an intra-prediction mode from a sequence of collocated blocks.

FIG. 9 is a conceptual diagram illustrating an example of obtaining an intra-prediction mode from a sequence of collocated blocks, in accordance with the techniques of this disclosure. In frame 180, which is an inter-frame, block 182 is inter-coded. Video encoder 20 and video decoder 30 may be configured to derive an intra-prediction mode to associate with block 182 from intra-prediction mode 186 associated with collocated block 172 in collocated frame 170, which is an intra-frame. In frame 190, which is an inter-frame, block 192 is also inter-coded. Video encoder 20 and video decoder 30 may be configured to derive an intra-prediction mode to associate with block 192 from intra-prediction mode 196 associated with collocated block 182 in collocated frame 180. As can be seen in FIG. 9, in some examples, video encoder 20 and video decoder 30 may propagate an intra-prediction from one block (e.g., block 172) through multiple frames in succession.

In other examples of the disclosure, instead of deriving intra-prediction modes from collocated blocks of inter-coded blocks, video encoder 20 and video decoder 30 may derive intra-prediction modes for inter-coded blocks from intra-prediction modes associated with reference blocks. The reference blocks may be the blocks used for performing inter-prediction on the current inter-coded block and may be identified by a motion vector, a reference index, and a reference picture list.

Figure 10:
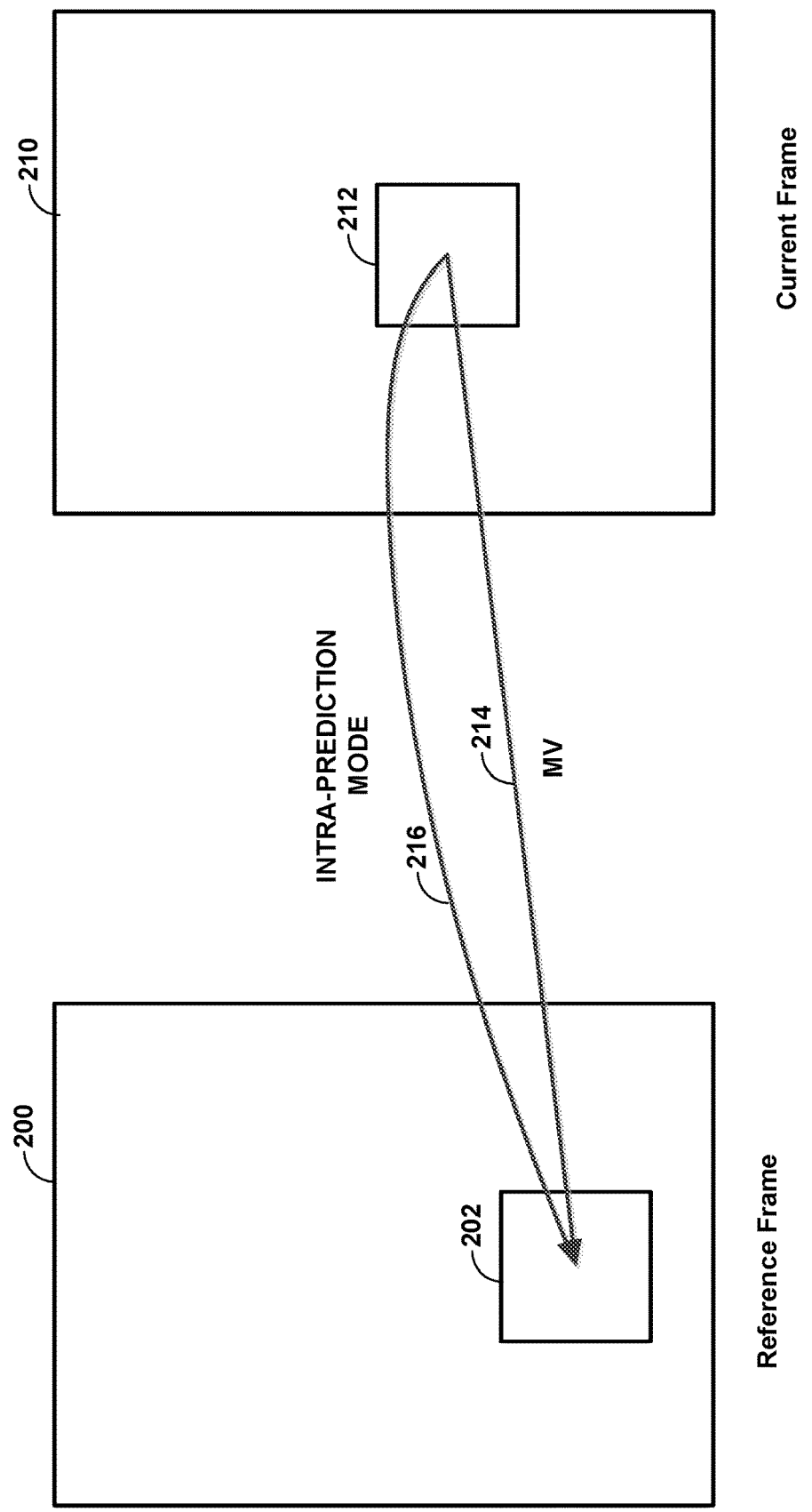
FIG. 10 is a conceptual diagram illustrating an example of obtaining an intra-prediction mode from a reference block.

FIG. 10 is a conceptual diagram illustrating an example of obtaining an intra-prediction mode from a reference block and a motion vector, in accordance with the techniques of this disclosure. In this example, video encoder 20 and video decoder 30 may be configured to associate the intra-prediction mode of the reference block in the reference frame as the intra-prediction mode of the current inter-coded block. As shown in FIG. 10, block 212 in current frame 210 is inter-coded according to motion vector (MV) 214. MV 214 points to reference block 202 in reference frame 200. Video encoder 20 and video decoder 30 may locate reference block 202 in reference frame 200 with MV 214, as used in motion compensation in HEVC, JEM or any existing or future video coding solution. Video encoder 20 and video decoder 30 may associate intra-prediction mode 216 associated with reference block 202 as the intra-prediction mode for current block 212. In some examples, instead of using the real MV of current block 212 to locate reference block 200, video encoder 20 and video decoder 30 may use a zero motion to locate a reference block in a reference picture.

Reference block 202 in reference frame 200 may be intra-coded, or reference block 202 may be inter-coded. In the former case, the intra-prediction mode of reference block 202 is signaled from video encoder 20 to video decoder 30 when coding reference block 202. In the latter case, the intra-prediction mode of reference block 202 is also derived, for example, using the intra-prediction mode propagation techniques of this disclosure.

Figure 11:
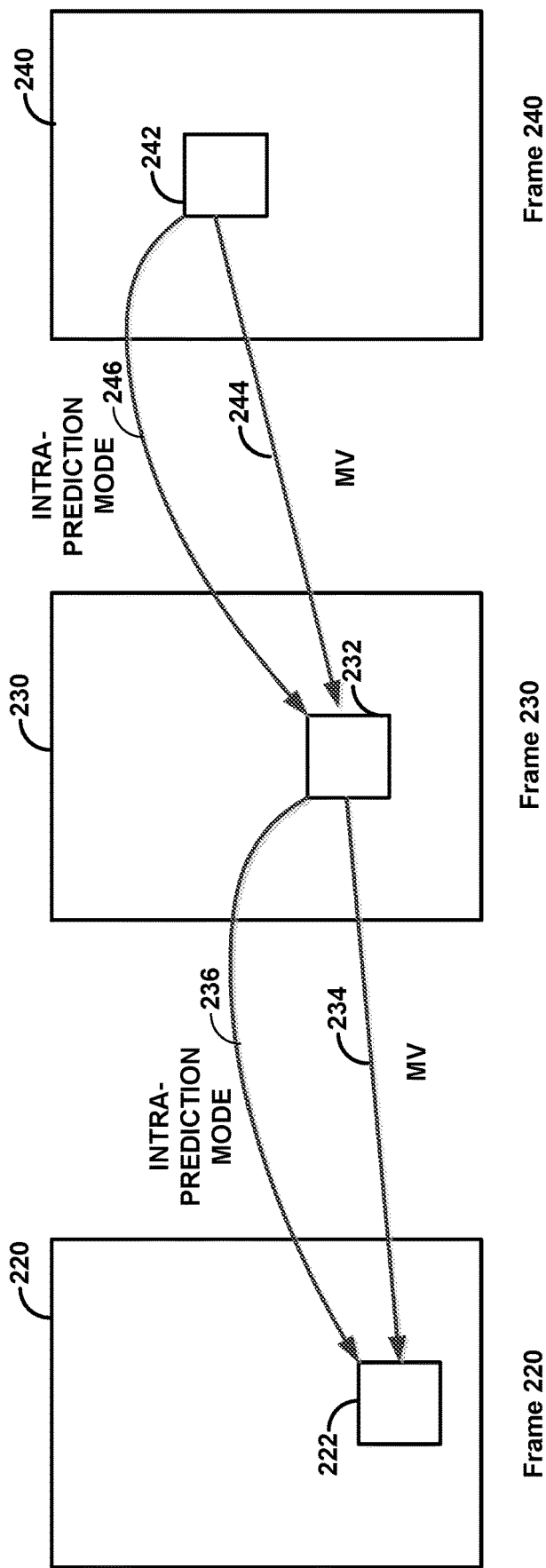
FIG. 11 is a conceptual diagram illustrating an example of obtaining an intra-prediction mode from a sequence of reference blocks.

FIG. 11 is a conceptual diagram illustrating an example of obtaining an intra-prediction mode from a sequence of reference blocks and motion vectors, in accordance with the techniques of this disclosure. FIG. 11 shows an example of how intra-prediction modes are propagated. In frame 230, which is an inter-frame, block 232 is inter-coded. Video encoder 20 and video decoder 30 may be configured to derive an intra-prediction mode to associate with block 232 from intra-prediction mode 236 associated with reference block 222 in reference frame 220, which is an intra-frame. Reference block 222 may be located by MV 234. In frame 240, which is an inter-frame, block 242 is also inter-coded. Video encoder 20 and video decoder 30 may be configured to derive an intra-prediction mode to associate with block 242 from intra-prediction mode 246 associated with reference block 232 in collocated frame 230. Reference block 232 may be located by MV 244. As can be seen in FIG. 11, in some examples, video encoder 20 and video decoder 30 may propagate an intra-prediction from one block (e.g., block 222) through multiple frames in succession.

Figure 12:
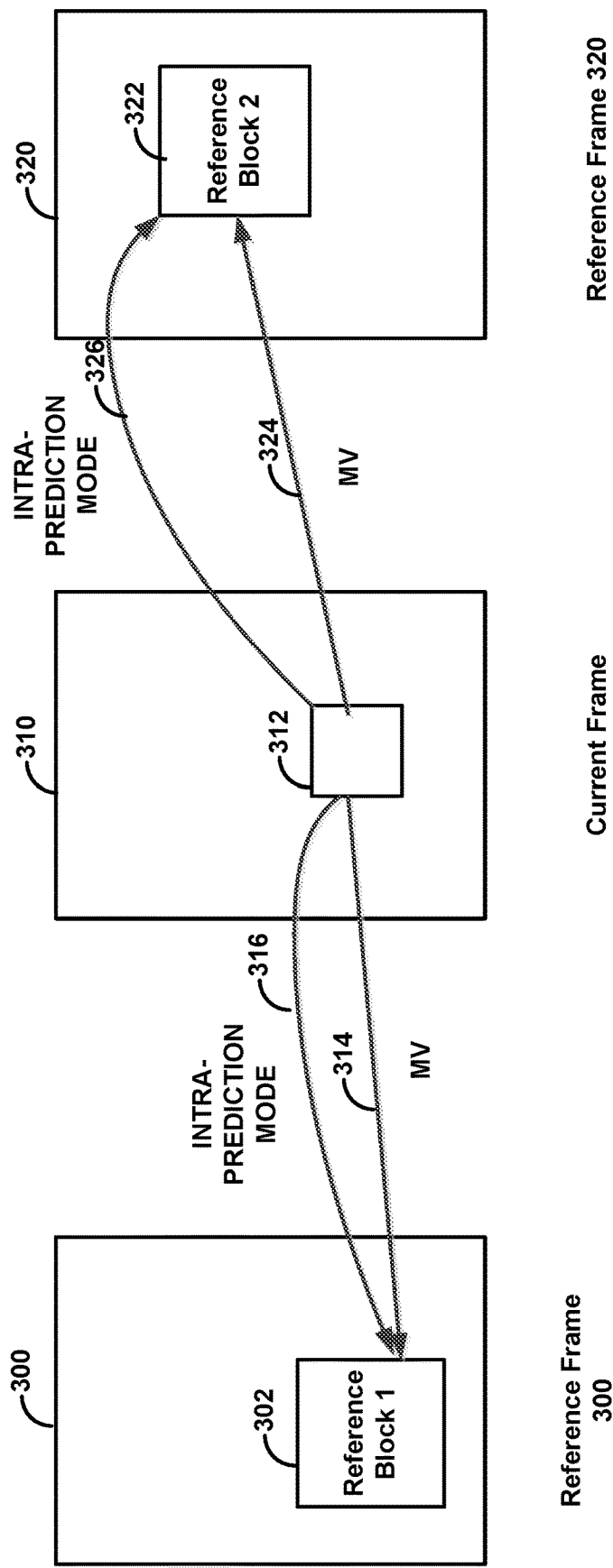
FIG. 12 is a conceptual diagram illustrating an example of obtaining an intra-prediction mode from multiple reference blocks.

FIG. 12 is a conceptual diagram illustrating an example of obtaining an intra-prediction mode from multiple reference blocks, in accordance with the techniques of this disclosure. In some examples, such as bi-prediction showed in FIG. 12, there may be more than one reference blocks for the current inter-coded block. In the example of FIG. 12, current block 312 in frame 310 is predicted from both reference block 302 in frame 300 and reference block 322 in frame 320. Reference block 302 is located by MV 314 and reference block 322 is located by MV 324. In this example, in order to associate an intra-prediction mode with current block 310, video encoder 20 and video decoder 30 may consider both intra-prediction mode 316, associated with reference block 302, and intra-prediction mode 326, associated with reference block 322, as candidate modes. Video encoder 20 and video decoder 30 may be configured to perform a process to determine which of the candidate modes to associate as the intra-prediction mode for current block 312. The process performed may be predetermined and may be performed in a reciprocal manner by both video encoder 20 and video decoder 30. In the example of FIG. 12, there are only two candidate intra-prediction modes. However, the techniques of this disclosure may be used with any number of candidate intra-prediction modes.

In one example, video encode 20 and video decoder 30 may derive the intra-prediction mode of current block 312 as the intra-prediction mode which appears the most times among the candidate modes. For instance, there may be three reference blocks with three respective candidate intra-prediction modes (e.g., indicated by indices 21, 33 and 33). In this instance, video encoder 20 and video decoder 30 may select the intra-prediction mode having index 33 as the intra-prediction mode of the current block because index 33 occurs the most times (e.g., two instances of index 33 and one of 21).

In another example, video encoder 20 and video decoder 30 may be configured to derive the intra-prediction mode of the current block with the intra-prediction modes in the reference blocks in a priority-based strategy. The candidate mode with the highest priority may be output as the intra-prediction mode of the current block. In one example, a candidate intra-prediction mode of an intra-coded reference block (i.e., a reference block coded using intra-prediction) has a higher priority than a candidate intra-prediction mode of an inter-coded reference block (i.e., a reference block coded using inter-prediction). In another example, a candidate intra-prediction mode that is not a DC or Planar mode (e.g., the intra-prediction mode index >=2 in HEVC and JEM) has a higher priority than a candidate intra-prediction mode that is a DC or Planar mode (e.g., the intra-prediction mode index is <2 in HEVC and JEM).

In another example, video encoder 20 and video decoder 30 may be configured to select a candidate intra-prediction mode of a reference block in a reference frame which has a smaller temporal distance to the current frame. That is, a candidate intra-prediction mode from a reference frame with a smaller temporal distance has a higher priority than a candidate intra-prediction mode of a reference block in a reference frame which has a larger temporal distance to the current frame. Temporal distance may be calculated as based on a picture order count (POC) number of the reference frame (POCref) compared to a POC number of the current frame (POCcur). For example, video encoder 20 and video decoder 30 may determine the temporal distance as |POCref-POCcur|, where POC refers to picture order count defined in HEVC.

In another example, video encoder 20 and video decoder 30 may be configured to select a candidate intra-prediction mode based on a quantization parameter (QP). For example, a candidate intra-prediction mode of a reference block with a smaller QP has a higher priority than a candidate intra-prediction mode of a reference block with a larger QP.

An example of priority strategy when there are two candidate intra-prediction modes, such as the bi-prediction example of FIG. 12, may be as follows.

Assume there are two candidate intra-prediction modes aiIntraMode [0] and aiIntraMode[1]. The inter/intra coding mode, QP, and temporal distance of the reference blocks having the two candidate intra-prediction modes are indicated as aiPredMode[0], aiPredMode[1], iPicQP[1], aiPicQP[0], and aiPOCdelta[0], and aiPOCdelta[1], respectively. Then the selected candidate index, denoted as iSelCand, may be derived by video encoder 20 and video decoder 30 as shown in the following pseudo code:

```
if (aiPredMode[0] == MODE_INTRA && aiPredMode[1] == MODE_INTER)
    {
        iSelCand = 0;
    }
else if (aiPredMode[1] == MODE_INTRA && aiPredMode[0] == MODE_INTER)
    {
        iSelCand = 1;
    }
else
    {
        if (aiIntraMode [0] > 1 && aiIntraMode [1] <= 1)
        {
            iSelCand = 0;
        }
        else if (aiIntraMode [1] > 1 && aiIntraMode [0] <= 1)
        {
            iSelCand = 1;
        }
        else
        {
            if (aiPOCdelta[0] < aiPOCdelta[1])
            {
                iSelCand = 0;
            }
            else if (aiPOCdelta[1] < aiPOCdelta[0])
            {
                iSelCand = 1;
            }
            else
            {
                if (aiPicQP[1] < aiPicQP[0])
                {
                    iSelCand = 1;
                }
                else
                {
                    iSelCand =0;
                }
            }
        }
    }
}
```

Figure 13:
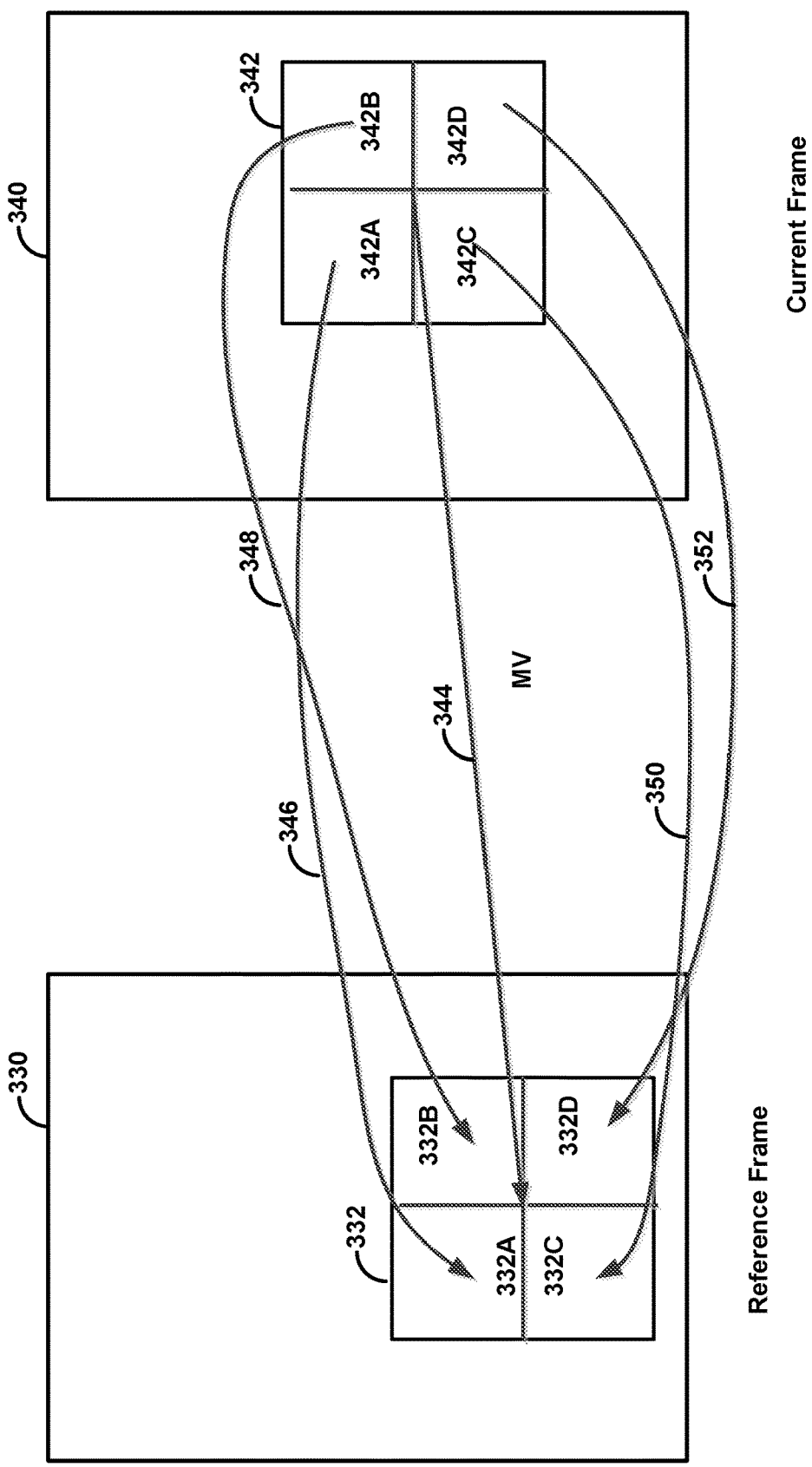
FIG. 13 is a conceptual diagram illustrating an example of obtaining an intra-prediction mode for a sub-block of a video block.

FIG. 13 is a conceptual diagram illustrating an example of obtaining an intra-prediction mode for a sub-block of a video block, in accordance with the techniques of this disclosure. As shown in FIG. 13, current block 342 in current frame 340 may be divided into sub-blocks 342A, 342B, 342C, and 342D. Current block 342 is an inter-coded block. Current block 342 is inter-coded relative to reference block 332 in reference frame 330, which is located by MV 344.

In one example, of the disclosure, video encoder 20 and video decoder 30 may derive a single intra-prediction mode for current block 342, and associate that single intra-prediction mode with each of sub-blocks 342A, 342B, 342C, and 342D. In other examples, video encoder 20 and video decoder 30 may derive an intra-prediction mode for each of sub-blocks 342A, 342B, 342C, and 342D. FIG. 13 shows an example where video encoder 20 and video decoder 30 derive intra-prediction mode 346 from reference sub-block 332A for current sub-block 342A, intra-prediction mode 348 from reference sub-block 332B for current sub-block 342B, intra-prediction mode 350 from reference sub-block 332C for current sub-block 342C, and intra-prediction mode 352 from reference sub-block 332D for current sub-block 342D. A sub-block may be any size, such as 2×2, 4×4, 2×4, 4×2 and so on.

Figure 14:
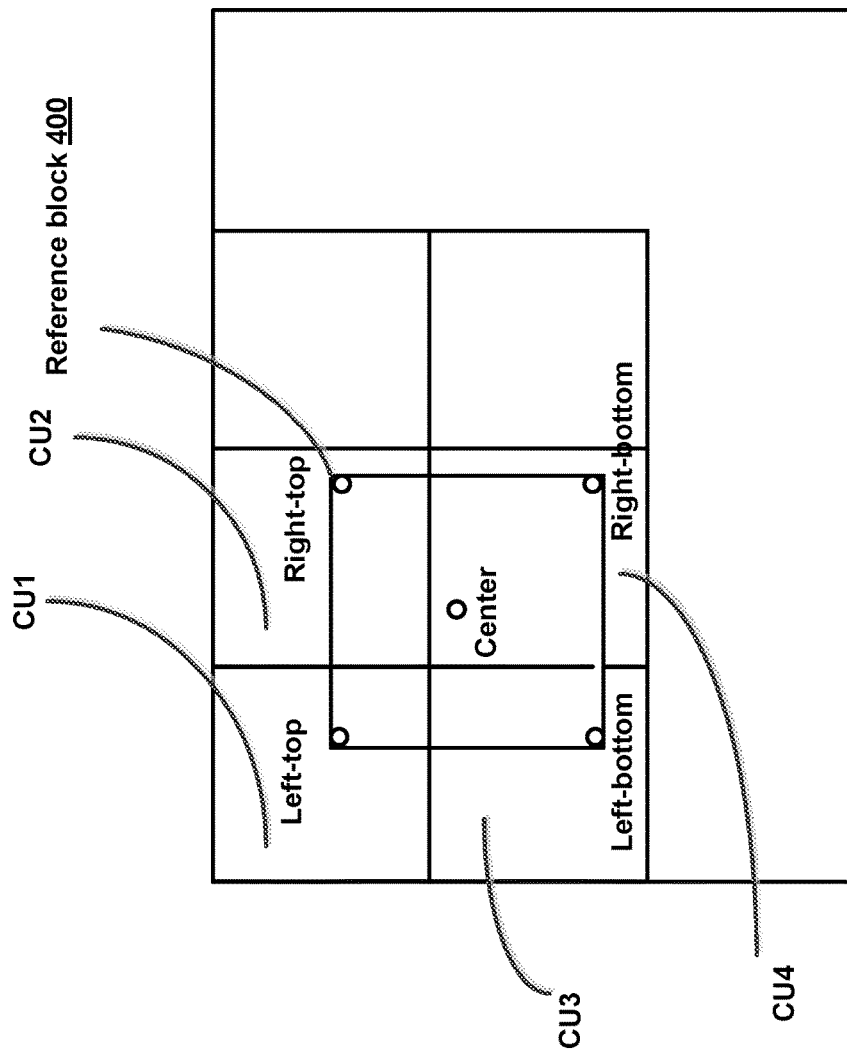
FIG. 14 is a conceptual diagram illustrating an example of obtaining an intra-prediction mode for a block that covers multiple collocated blocks.

FIG. 14 is a conceptual diagram illustrating an example of obtaining an intra-prediction mode from a reference block that covers multiple coding units, in accordance with the techniques of this disclosure. The collocated block or the reference block (or reference sub-block) may cover more than one coding block, i.e. Coding Unit (CU)/Prediction Unit (PU)/Transform Unit (TU) in HEVC (or CU in JEM). FIG. 14 shows one such example, where the reference block 400 covers four coding blocks: CU1, CU2, CU3, and CU4. To derive the intra-prediction mode from a collocated block or a reference block (sub-block) covering more than one coding block, the following strategies may be applied.

In one example, video encoder 20 and video decoder 30 may use the coding block covering a specific point in the collocated block or the reference block (or sub-block), and the intra-prediction mode of the selected block may be treated as the intra-prediction mode of collocated block or the reference block (or sub-block). For example, video encoder 20 and video decoder 30 may use the intra-prediction mode associated with CU4 if the center point is defined as the specific point. In another example, video encoder 20 and video decoder 30 may use the intra-prediction mode associated with CU1 if the left-top point is defined. The specific point of reference block 400 to use to determine which intra-prediction mode of a particular CU to select may be predetermine and used by both video encoder 20 and video decoder 30.

In another example, the coding block covering the largest area for the collocated block or the reference block (or sub-block) may be selected and the intra-prediction mode of the selected block may be treated as the intra-prediction mode of collocated block or the reference block (or sub-block). For example, CU4 may selected since it covers the largest area in the collocated block or the reference block in FIG. 14.

In another example, the intra-prediction modes of all or some of the coding blocks covering the collocated block or the reference block (sub-block) may be treated as candidate intra-prediction modes. In such examples, the video coder may implement any of the strategies defined above for determining which intra-prediction mode to select when multiple reference blocks are available.

Figure 15:
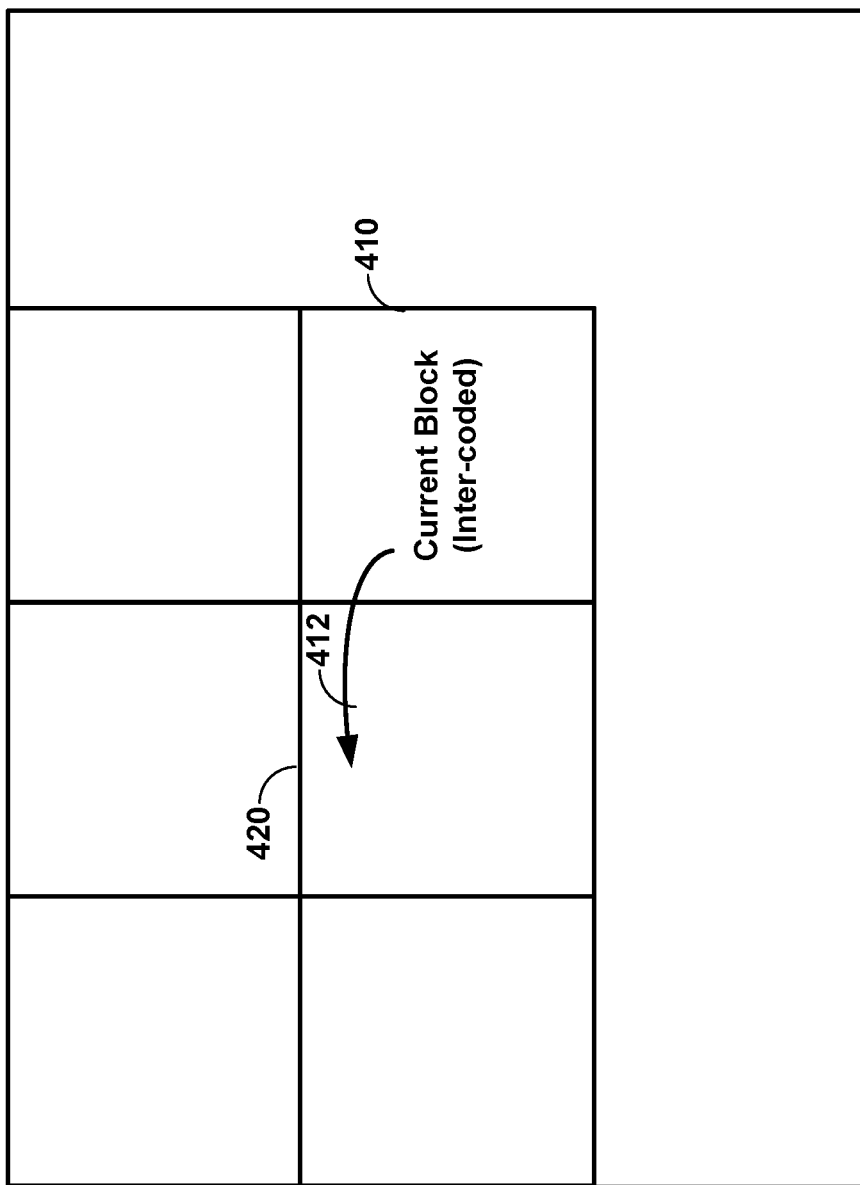
FIG. 15 is a conceptual diagram illustrating an example of obtaining an intra-prediction mode from a neighboring block.

FIG. 15 is a conceptual diagram illustrating an example of obtaining an intra-prediction mode from a neighboring block, in accordance with the techniques of this disclosure. In still another example, the intra-prediction mode of a spatially neighboring block will be treated as the intra-prediction mode of the current inter-coded block. That is, rather than propagating intra-prediction modes from reference blocks or collocated blocks in other frames, video encoder 20 and video decoder 30 may select the intra-prediction mode of a neighboring block to associate with a current inter-coded block. In FIG. 15, video encoder 20 and video decoder 30 may associate intra-prediction mode 412 from neighbor block 420 with current inter-coded block 410. The neighboring block used by video encoder 20 and video decoder 30 is not limited to the left neighbor shown in FIG. 15, but may be any neighboring block, such as neighboring blocks A, B, A1, A2, B0, B1, and B2 as shown in FIG. 4.

In the example of FIG. 15, neighbor block 420 may be intra-coded, or neighbor block 420 may be inter-coded. In the former case, the intra-prediction mode of neighbor block 420 is signaled from video encoder 20 to video decoder 30 when coding neighbor block 420. In the latter case, the intra-prediction mode of neighbor block 420 is also derived, for example, using the intra-prediction mode propagation techniques of this disclosure.

Figure 16:
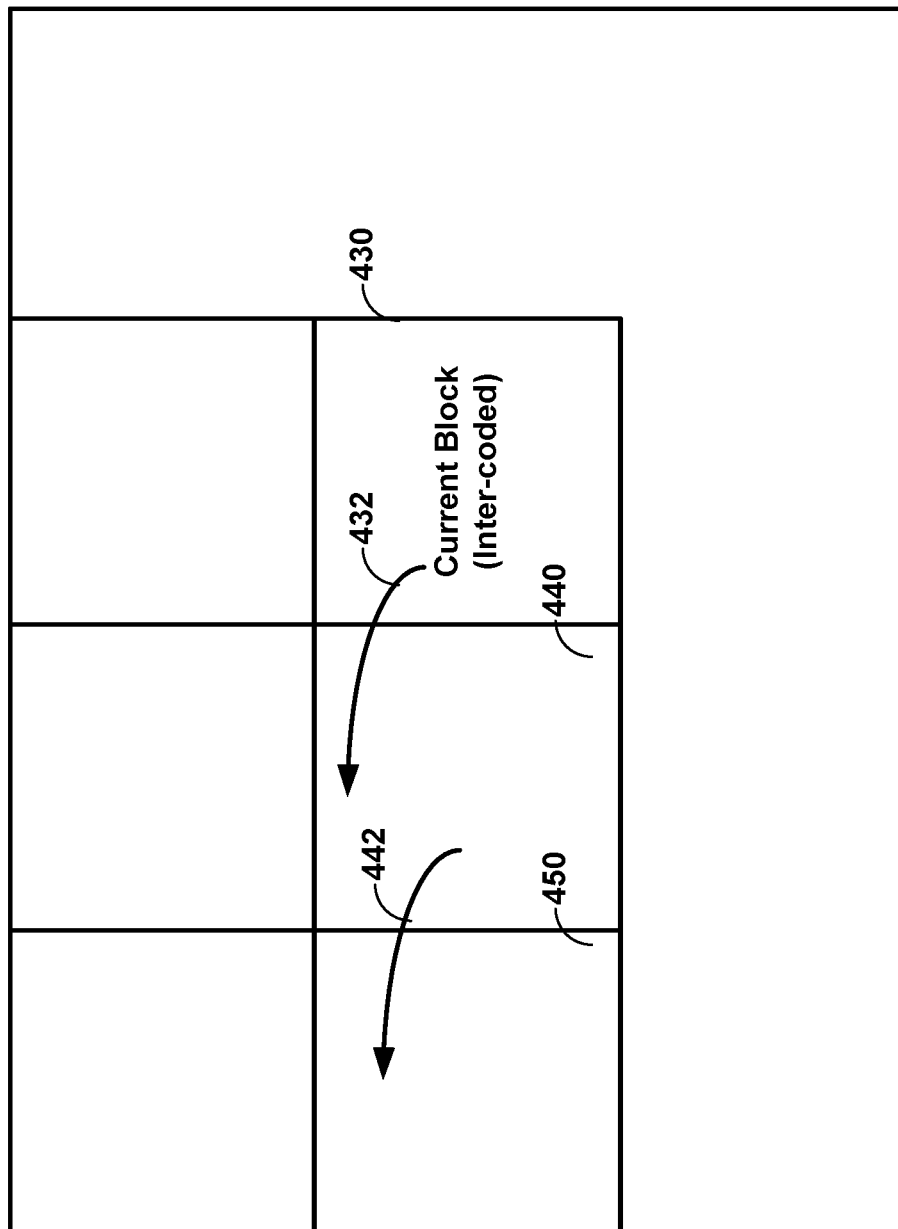
FIG. 16 is a conceptual diagram illustrating an example of obtaining an intra-prediction mode from a sequence of neighbor blocks.

FIG. 16 is a conceptual diagram illustrating an example of obtaining an intra-prediction mode from a sequence of contiguous blocks, in accordance with the techniques of this disclosure. FIG. 16 shows an example of how intra-prediction modes are propagated from neighboring blocks. For example, video encoder 20 and video decoder 30 may derive intra-prediction mode 432 from neighbor block 440 and associate intra-prediction mode 432 with current block 430. Similarly, video encoder 20 and video decoder 30 may derive intra-prediction mode 442 from neighbor block 450 and associate intra-prediction mode 442 with neighbor block 440.

In another example of the disclosure, one of the most probable mode (MPM)s derived as specified in HEVC (see, e.g., Section 8.4.2. of HEVC) or JEM may be treated as the intra-prediction mode of the current block. In general, a most probable mode list is a list of intra-prediction modes that are most likely to be used for coding a block. Video encoder 20 may signal an index in the most probably mode list indicating which of the most probable modes are to be used for coding a particular block. Video encoder 20 and video decoder 30 may be configured to derive the most probable modes (e.g., without signaling) based on some predetermined parameters. In an example of this disclosure, the first MPM derived for the MPM list, e.g., as specified in HEVC or JEM, may be treated as the intra-prediction mode of the current block.

In another example, the intra-prediction modes of more than one neighboring blocks may be treated as candidate modes. In such examples, the video coder may implement any of the strategies defined above for determining which intra-prediction mode to select when multiple reference blocks are available.

The usage of the proposed intra-propagation method may be applied on luma coding, as well as on chroma coding. In other words, both the luma intra-prediction mode and the chroma intra-prediction mode may be derived for an inter-coded block.

Whether to use the intra-propagation techniques discussed above may be signaled from video encoder 20 to video decoder 30 at the sequence level, frame level or slice level, such as in video parameter set (VPS), sequence parameter set (SPS), picture parameter set (PPS), slice header (SH) or another other parameter set.

In one example, using the proposed techniques, an inter-coded block may conduct intra-prediction with its derived intra-prediction mode. The intra-prediction and the inter-prediction for the inter-coded block may be weighted summed as the final prediction for the block. For example, video decoder 30 may decode a block of video data using an inter-prediction mode to form a first prediction, decode the block of video data using the intra-prediction mode to form a second prediction, and combine the first prediction and the second prediction as a weighted sum to produce a final prediction for the block of video data.

With the proposed method, the predictive coding approach to code the intra-prediction modes for intra-coded blocks in inter-frames may be improved. In some existing intra mode coding methods such as those defined in HEVC and JEM, a neighboring block which is inter-coded may be marked as "unavailable" when coding the intra mode of the current block. With the intra mode propagation techniques described above, a neighboring block which is inter-coded may be no longer marked as "unavailable". Instead, the neighboring block's derived intra-prediction mode of a neighboring inter-coded block may be used to predict the intra-prediction mode of the current block.

In one example, the derived intra-prediction mode of a neighboring inter-coded block may be used in the same way as it is an intra-coded neighboring block, and the derived intra-prediction mode may be treated in the same way as it is signaled intra-prediction mode in an MPM derivation process.

In another example of the disclosure, the derived intra-prediction mode of a neighboring inter-coded block is treated specially in the MPM derivation process. After all or some of the neighboring intra-coded blocks have been checked and their intra-prediction modes have been put into the MPM list, video encoder 20 and video decoder 30 may check the neighboring inter-coded blocks and their derived intra-prediction modes are placed into the MPM list after the neighboring intra-coded blocks' intra-prediction mode.

In one example, the MPM list may be filled as the pseudo codes below:

```
MPM_List is empty;
MPM_Num = 0;
if( isAvailable(A1) && Intra_Prediction_Mode(A1) is not in MPM_List)
    MPM_List[MPM_Num++]=Intra_Prediction_Mode(A1);
if( isAvailable(B1) && Intra_Prediction_Mode(B1) is not in MPM_List)
    MPM_List[MPM_Num++]=Intra_Prediction_Mode(B1);
if( Planar is not in MPM_List)
    MPM_List[MPM_Num++]= Planar;
if( DC is not in MPM_List)
    MPM_List[MPM_Num++]= DC;
if( isAvailable(A2) && Intra_Prediction_Mode(A2) is not in MPM_List)
    MPM_List[MPM_Num++]=Intra_Prediction_Mode(A2);
if( isAvailable(B2) && Intra_Prediction_Mode(B2) is not in MPM_List)
    MPM_List[MPM_Num++]=Intra_Prediction_Mode(B2);
if( isAvailable(B0) && Intra_Prediction_Mode(B0) is not in MPM_List)
    MPM_List[MPM_Num++]=Intra_Prediction_Mode(B0);
```

Where MPM List refers to the MPM list; MPM Num refers to the number of modes in the MPM list; Intra_Prediction_Mode(X) refers to the intra-prediction mode in neighboring block X; isAvailable(X) returns true if neighbouring block X is available; and false if it is unavailable.

In another example, the MPM list may be filled as the pseudo codes below:

```
MPM_List is empty;
MPM_Num = 0;
DerivedIntra_List is empty;
DerivedIntra_Num = 0
if( isAvailable(A1) && Intra_Prediction_Mode(A1) is not in MPM_List)
{
    if( isIntraCoded(A1))
MPM_List[MPM_Num++]=Intra_Prediction_Mode(A1);
        else
DerivedIntra_List[DerivedIntra_Num++]= Intra_Prediction_Mode(A1);
}
if( isAvailable(B1) && Intra_Prediction_Mode(B1) is not in MPM_List)
{
    if( isIntraCoded(B1))
MPM_List[MPM_Num++]=Intra_Prediction_Mode(B1);
        else
DerivedIntra_List[DerivedIntra_Num++]= Intra_Prediction_Mode(B1);
}
if( Planar is not in MPM_List)
    MPM_List[MPM_Num++]= Planar;
if ( DC is not in MPM_List)
    MPM_List[MPM_Num++]= DC;
if( isAvailable(A2) && Intra_Prediction_Mode(A2) is not in MPM_List)
{
    if( isIntraCoded(A2))
MPM_List[MPM_Num++]Intra_Prediction_Mode(A2);
        else
DerivedIntra_List[DerivedIntra_Num++]= Intra_Prediction_Mode(A2);
}
if( isAvailable(B2) && Intra_Prediction_Mode(B2) is not in MPM_List)
{
    if( isIntraCoded(B2))
MPM_List[MPM_Num++]=Intra_Prediction_Mode(B2);
        else
DerivedIntra_List[DerivedIntra_Num++]= Intra_Prediction_Mode(B2);
}
if( isAvailable(B0) && Intra_Prediction_Mode(B0) is not in MPM_List)
{
    if( isIntraCoded(B0))
MPM_List[MPM_Num++]=Intra_Prediction_Mode(B0);
        else
DerivedIntra_List[DerivedIntra_Num++]= Intra_Prediction_Mode(B0);
}
for each mode M in DerivedIntra_List
{
    If( M is not in MPM_List)
MPM_List[MPM_Num++]=M;
}
```

Where MPM List refers to the MPM list; MPM_Num refers to the number of modes in the MPM list; Intra_Prediction_Mode(X) refers to the intra-prediction mode in neighboring block X; isAvailable(X) returns true if neighbouring block X is available; false if it is unavailable; DerivedIntra_List refers to a list recording derived intra-prediction modes in neighboring blocks; and DerivedIntra_Num refers to the number of modes in DerivedIntra_List;

In still another example, the MPM list may be filled as the pseudo codes below:

```
MPM_List is empty;
MPM_Num = 0;
DerivedIntra_List is empty;
DerivedIntra_Num = 0
if( isAvailable(A1) && Intra_Prediction_Mode(A1) is not in MPM_List)
{
    if( isIntraCoded(A1))
MPM_List[MPM_Num++]=Intra_Prediction_Mode(A1);
        else
DerivedIntra_List[DerivedIntra_Num++]= Intra_Prediction_Mode(A1);
}
if( isAvailable(B1) && Intra_Prediction_Mode(B1) is not in MPM_List)
{
    if( isIntraCoded(B1))
MPM_List[MPM_Num++]=Intra_Prediction_Mode(B1);
        else
DerivedIntra_List[DerivedIntra_Num++]= Intra_Prediction_Mode(B1);
}
for each mode M in DerivedIntra_List
{
    If( M is not in MPM_List)
MPM_List[MPM_Num++]=M;
}
DerivedIntra_List is empty;
DerivedIntra_Num = 0
if( Planar is not in MPM_List)
    MPM_List[MPM_Num++]= Planar;
if( DC is not in MPM_List)
    MPM_List[MPM_Num++]= DC;
if( isAvailable(A2) && Intra_Prediction_Mode(A2) is not in MPM_List)
{
    if( isIntraCoded(A2))
MPM_List[MPM_Num++]=Intra_Prediction_Mode(A2);
        else
DerivedIntra_List[DerivedIntra_Num++]= Intra_Prediction_Mode(A2);
}
if( isAvailable(B2) && Intra_Prediction_Mode(B2) is not in MPM_List)
{
    if( isIntraCoded(B2))
MPM_List[MPM_Num++]=Intra_Prediction_Mode(B2);
        else
DerivedIntra_List[DerivedIntra_Num++]= Intra_Prediction_Mode(B2);
}
```

-continued

```
if( isAvailable(B0) && Intra_Prediction_Mode(B0) is not in MPM_List)
{
    if( isIntraCoded(B0))
MPM_List[MPM_Num++]=Intra_Prediction_Mode(B0);
    else
DerivedIntra_List[DerivedIntra_Num++]= Intra_Prediction_Mode(B0);
}
for each mode M in DerivedIntra_List
{
    If( M is not in MPM_List)
MPM_List[MPM_Num++]=M;
}
```

Figure 17:
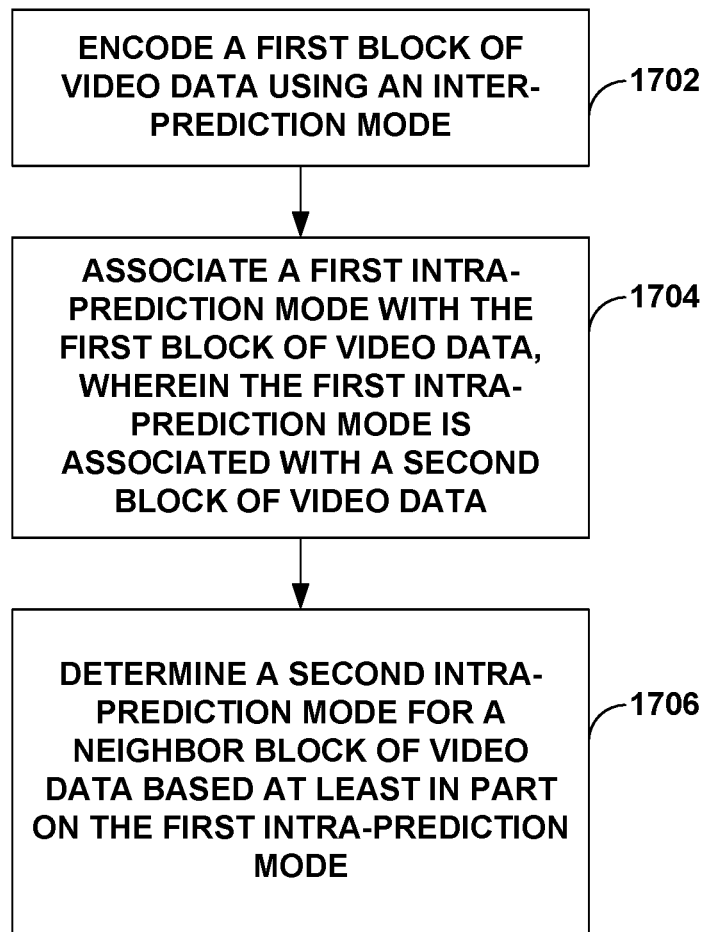
FIG. 17 is a flow diagram illustrating an example encoding technique of the disclosure.

FIG. 17 is a flow diagram illustrating an example encoding technique of the disclosure. The techniques of FIG. 17 may be performed by one or more structural components of video encoder 20.

In one example of the disclosure, video encoder 20 may be configured to encode a first block of video data using an inter-prediction mode (1702). In one example of the disclosure, the first block of video data is a subblock of video data. Video encoder 20 may further be configured to associate a first intra-prediction mode with the first block of video data, wherein the first intra-prediction mode is associated with a second block of video data (1704).

In one example of the disclosure, the first block of video data is in a current frame and the second block of video data is a collocated block in a second frame. In this example, video encoder 20 may be configured to locate the collocated block based on a position of the first block of video data and determine the first intra-prediction mode from the collocated block.

In another example of the disclosure, the first block of video data is in a current frame, and the second block of video data is a reference block in a reference frame. In this example, video encoder 20 may be configured to locate the reference block based on a motion vector associated with the first block of video data and determine the first intra-prediction mode from the reference block. In one example, the motion vector is a zero motion vector.

In another example of the disclosure, the second block of video data is included in a candidate list of two or more blocks of video data. In this example, video encoder 20 may be configured to determine the first intra-prediction mode from two or more intra-prediction modes associated with the two or more blocks of video data.

In one example of the disclosure, the first block of video data is a subblock of video data. In another example of the disclosure, the first block of video data includes a plurality of sub-blocks. In this example, video encoder 20 may be configured to associate the first intra-prediction mode with each of the plurality of sub-blocks.

In another example of the disclosure, the first block of video data is in a current frame and the second block of video data is in the current frame.

Video encoder 20 may be further configured to determine a second intra-prediction mode for a neighbor block of video data based at least in part on the first intra-prediction mode (1706). In one example, video encoder 20 may encode the first block of video data using the inter-prediction mode to form a first prediction, encode the first block of video data using the first intra-prediction mode to form a second prediction, and combine the first prediction and the second prediction as a weighted sum to produce a final prediction for the first block of video data.

In another example, video encoder 20 may, to determine the second intra-prediction mode for the neighbor block of video data based at least in part on the first intra-prediction mode, determine a most probable mode list, wherein the most probable mode list includes the first intra-prediction mode associated with the first block of video data, and determine the second intra-prediction mode for the neighbor block of video data from the most probable mode list.

Figure 18:
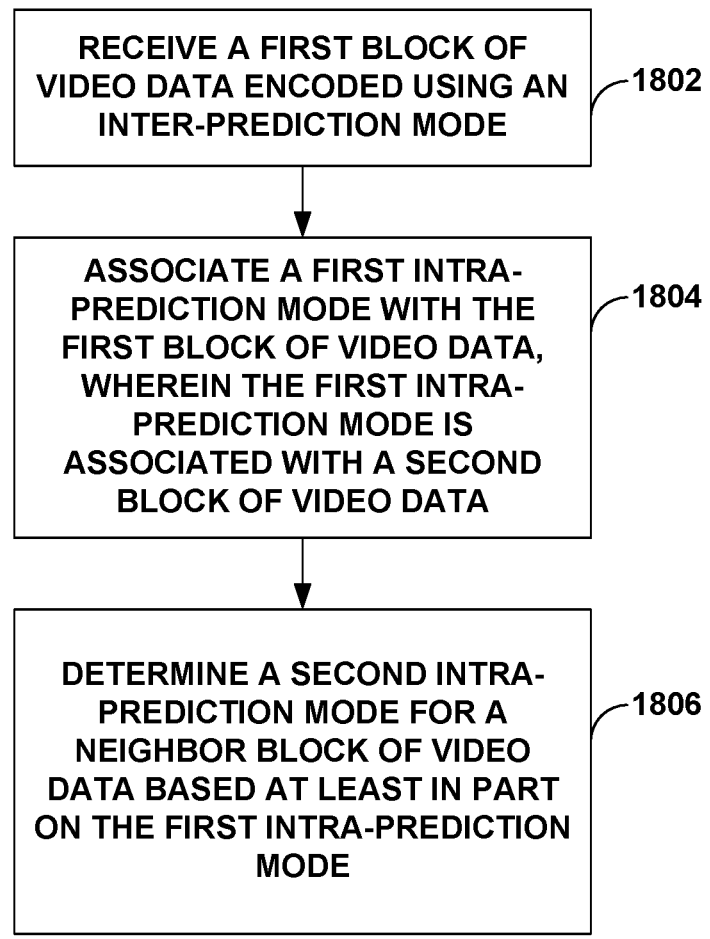
FIG. 18 is a flow diagram illustrating an example decoding technique of the disclosure.

FIG. 18 is a flow diagram illustrating an example decoding technique of the disclosure. The techniques of FIG. 18 may be performed by one or more structural components of video decoder 30.

In one example of the disclosure, video decoder 30 may be configured to receive a first block of video data encoded using an inter-prediction mode (1802). In one example of the disclosure, the first block of video data is a subblock of video data. Video decoder 30 may further be configured to associate a first intra-prediction mode with the first block of video data, wherein the first intra-prediction mode is associated with a second block of video data (1804).

In one example of the disclosure, the first block of video data is in a current frame and the second block of video data is a collocated block in a second frame. In this example, video decoder 30 may be configured to locate the collocated block based on a position of the first block of video data and determine the first intra-prediction mode from the collocated block.

In another example of the disclosure, the first block of video data is in a current frame, and the second block of video data is a reference block in a reference frame. In this example, video decoder 30 may be configured to locate the reference block based on a motion vector associated with the first block of video data and determine the first intra-prediction mode from the reference block. In one example, the motion vector is a zero motion vector.

In another example of the disclosure, the second block of video data is included in a candidate list of two or more blocks of video data. In this example, video decoder 30 may be configured to determine the first intra-prediction mode from two or more intra-prediction modes associated with the two or more blocks of video data.

In one example of the disclosure, the first block of video data is a subblock of video data. In another example of the disclosure, the first block of video data includes a plurality of sub-blocks. In this example, video decoder 30 may be configured to associate the first intra-prediction mode with each of the plurality of sub-blocks.

In another example of the disclosure, the first block of video data is in a current frame and the second block of video data is in the current frame.

Video decoder 30 may be further configured to determine a second intra-prediction mode for a neighbor block of video data based at least in part on the first intra-prediction mode (1806). In one example, video decoder 30 may decode the first block of video data using the inter-prediction mode to form a first prediction, decode the first block of video data using the first intra-prediction mode to form a second prediction, and combine the first prediction and the second prediction as a weighted sum to produce a final prediction for the first block of video data.

In another example, video decoder 30 may, to determine the second intra-prediction mode for the neighbor block of video data based at least in part on the first intra-prediction mode, determine a most probable mode list, wherein the most probable mode list includes the first intra-prediction mode associated with the first block of video data, and determine the second intra-prediction mode for the neighbor block of video data from the most probable mode list.

Certain aspects of this disclosure have been described with respect to extensions of the HEVC standard for purposes of illustration. However, the techniques described in this disclosure may be useful for other video coding processes, including other standard or proprietary video coding processes under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein may be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of decoding video data, the method comprising:
    deriving a first intra-prediction mode for a first block of video data from a second block of video data, wherein the first block of video data was encoded using an inter-prediction mode, and wherein the second block of video data is different than the first block of video data;
    decoding the first block of video data using the inter-prediction mode;
    determining a second intra-prediction mode for a neighbor block of video data based at least in part on the first intra-prediction mode derived for the first block of video data; and
    decoding the neighbor block of video data using the second intra-prediction mode.

2. The method of claim 1,
    wherein the first block of video data is in a current frame,
    wherein the second block of video data is a collocated block in a second frame, and
    wherein deriving the intra-prediction mode further comprises:
        locating the collocated block based on a position of the first block of video data; and
        deriving the first intra-prediction mode from the collocated block.

3. The method of claim 1,
    wherein the first block of video data is in a current frame,
    wherein the second block of video data is a reference block in a reference frame, and
    wherein deriving the first intra-prediction mode further comprises:
        locating the reference block based on a motion vector associated with the first block of video data; and
        deriving the first intra-prediction mode from the reference block.

4. The method of claim 3, wherein the motion vector is a zero motion vector.

5. The method of claim 1,
wherein the second block of video data is included in a candidate list of two or more blocks of video data, and
wherein deriving the first intra-prediction mode further comprises:
deriving the first intra-prediction mode from two or more intra-prediction modes associated with the two or more blocks of video data.

6. The method of claim 1, wherein the first block of video data is a sub-block of video data.

7. The method of claim 1, wherein the first block of video data includes a plurality of sub-blocks, the method further comprising:
associating the first intra-prediction mode with each of the plurality of sub-blocks.

8. The method of claim 1, wherein the first block of video data is in a current frame, and wherein the second block of video data is in the current frame.

9. The method of claim 1, further comprising:
decoding the first block of video data using the inter-prediction mode to form a first prediction;
decoding the first block of video data using the first intra-prediction mode to form a second prediction; and
combining the first prediction and the second prediction as a weighted sum to produce a final prediction for the first block of video data.

10. The method of claim 1, wherein determining the second intra-prediction mode for the neighbor block of video data based at least in part on the first intra-prediction mode comprises:
determining a most probable mode list, wherein the most probable mode list includes the first intra-prediction mode; and
determining the second intra-prediction mode for the neighbor block of video data from the most probable mode list.

11. An apparatus configured to decode video data, the apparatus comprising:
a memory configured to store a first block of video data encoded using an inter-prediction mode; and
one or more processors in communication with the memory, the one or more processors configured to:
derive a first intra-prediction mode for a first block of video data from a second block of video data, wherein the first block of video data was encoded using an inter-prediction mode, and wherein the second block of video data is different than the first block of video data;
decode the first block of video data using the inter-prediction mode;
determine a second intra-prediction mode for a neighbor block of video data based at least in part on the first intra-prediction mode derived for the first block of video data; and
decode the neighbor block of video data using the second intra-prediction mode.

12. The apparatus of claim 11,
wherein the first block of video data is in a current frame, wherein the second block of video data is a collocated block in a second frame, and
wherein deriving the first intra-prediction mode, the one or more processors are further configured to:
locate the collocated block based on a position of the first block of video data; and
derive the first intra-prediction mode from the collocated block.

13. The apparatus of claim 11,
wherein the first block of video data is in a current frame,
wherein the second block of video data is a reference block in a reference frame, and
wherein deriving the first intra-prediction mode, the one or more processors are further configured to:
locate the reference block based on a motion vector associated with the first block of video data; and
derive the first intra-prediction mode from the reference block.

14. The apparatus of claim 13, wherein the motion vector is a zero motion vector.

15. The apparatus of claim 11,
wherein the second block of video data is included in a candidate list of two or more blocks of video data, and
wherein deriving the intra-prediction mode, the one or more processors are further configured to:
derive the first intra-prediction mode from two or more intra-prediction modes associated with the two or more blocks of video data.

16. The apparatus of claim 11, wherein the first block of video data is a sub-block of video data.

17. The apparatus of claim 11, wherein the first block of video data includes a plurality of sub-blocks, and wherein the one or more processors are further configured to:
associate the first intra-prediction mode with each of the plurality of sub-blocks.

18. The apparatus of claim 11, wherein the first block of video data is in a current frame, and wherein the second block of video data is in the current frame.

19. The apparatus of claim 11, wherein the one or more processors are further configured to:
decode the first block of video data using the inter-prediction mode to form a first prediction;
decode the first block of video data using the first intra-prediction mode to form a second prediction; and
combine the first prediction and the second prediction as a weighted sum to produce a final prediction for the first block of video data.

20. The apparatus of claim 11, wherein to determine the second intra-prediction mode for the neighbor block of video data based at least in part on the first intra-prediction mode, the one or more processors are further configured to:
determine a most probable mode list, wherein the most probable mode list includes the first intra-prediction mode; and
determine the second intra-prediction mode for the neighbor block of video data from the most probable mode list.

21. An apparatus configured to decode video data, the apparatus comprising:
means for deriving a first intra-prediction mode for a first block of video data from a second block of video data, wherein the first block of video data was encoded using an inter-prediction mode, and wherein the second block of video data is different than the first block of video data;
means for decoding the first block of video data using the inter-prediction mode;
means for determining a second intra-prediction mode for a neighbor block of video data based at least in part on the first intra-prediction mode; and
means for decoding the neighbor block of video data using the second intra-prediction mode.

22. A non-transitory computer-readable storage medium storing instructions that, when executed, causes one or more processors of a device configured to decode video data to:
  derive a first intra-prediction mode for a first block of video data from a second block of video data, wherein the first block of video data was encoded using an inter-prediction mode, and wherein the second block of video data is different than the first block of video data;
  decode the first block of video data using the inter-prediction mode;
  determine a second intra-prediction mode for a neighbor block of video data based at least in part on the first intra-prediction mode; and
  decode the neighbor block of video data using the second intra-prediction mode.

23. A method of encoding video data, the method comprising:
  encoding a first block of video data using an inter-prediction mode;
  deriving a first intra-prediction mode for the first block of video data from a second block of video data, wherein the second block of video data is different than the first block of video data; and
  determining a second intra-prediction mode for a neighbor block of video data based at least in part on the first intra-prediction mode derived for the first block of video data.

24. The method of claim 23,
  wherein the first block of video data is in a current frame,
  wherein the second block of video data is a collocated block in a second frame, and
  wherein deriving the first intra-prediction mode further comprises:
    locating the collocated block based on a position of the first block of video data; and
    deriving the first intra-prediction mode from the collocated block.

25. The method of claim 23,
  wherein the first block of video data is in a current frame,
  wherein the second block of video data is a reference block in a reference frame, and
  wherein deriving the first intra-prediction mode further comprises:
    locating the reference block based on a motion vector associated with the first block of video data; and
    deriving the first intra-prediction mode from the reference block.

26. The method of claim 25, wherein the motion vector is a zero motion vector.

27. The method of claim 23,
  wherein the second block of video data is included in a candidate list of two or more blocks of video data, and
  wherein deriving the first intra-prediction mode further comprises:
    deriving the first intra-prediction mode from two or more intra-prediction modes associated with the two or more blocks of video data.

28. The method of claim 23, wherein the first block of video data is a sub-block of video data.

29. The method of claim 23, wherein the first block of video data includes a plurality of sub-blocks, the method further comprising:
  associating the first intra-prediction mode with each of the plurality of sub-blocks.

30. The method of claim 23, wherein the first block of video data is in a current frame, and wherein the second block of video data is in the current frame.

31. The method of claim 23, further comprising:
  encoding the first block of video data using the inter-prediction mode to form a first prediction;
  encoding the first block of video data using the first intra-prediction mode to form a second prediction; and
  combining the first prediction and the second prediction as a weighted sum to produce a final prediction for the first block of video data.

32. The method of claim 23, wherein determining the second intra-prediction mode for the neighbor block of video data based at least in part on the first intra-prediction mode comprises:
  determining a most probable mode list, wherein the most probable mode list includes the first intra-prediction mode; and
  determining the second intra-prediction mode for the neighbor block of video data from the most probable mode list.

33. An apparatus configured to encode video data, the apparatus comprising:
  a memory configured to store a first block of video data; and
  one or more processors in communication with the memory, the one or more processors configured to:
    encode the first block of video data using an inter-prediction mode;
    derive a first intra-prediction mode for the first block of video data from a second block of video data, wherein the second block of video data is different than the first block of video data; and
    determine a second intra-prediction mode for a neighbor block of video data based at least in part on the first intra-prediction mode derived for the first block of video data.

34. The apparatus of claim 33,
  wherein the first block of video data is in a current frame,
  wherein the second block of video data is a collocated block in a second frame, and
  wherein deriving the first intra-prediction mode, the one or more processors are further configured to:
    locate the collocated block based on a position of the first block of video data; and
    derive the first intra-prediction mode from the collocated block.

35. The apparatus of claim 33,
  wherein the first block of video data is in a current frame,
  wherein the second block of video data is a reference block in a reference frame, and
  wherein deriving the first intra-prediction mode, the one or more processors are further configured to:
    locate the reference block based on a motion vector associated with the first block of video data; and
    derive the first intra-prediction mode from the reference block.

36. The apparatus of claim 35, wherein the motion vector is a zero motion vector.

37. The apparatus of claim 33,
  wherein the second block of video data is included in a candidate list of two or more blocks of video data, and
  wherein deriving the first intra-prediction mode, the one or more processors are further configured to:
    derive the first intra-prediction mode from two or more intra-prediction modes associated with the two or more blocks of video data.

38. The apparatus of claim 33, wherein the first block of video data is a sub-block of video data.

39. The apparatus of claim 33, wherein the first block of video data includes a plurality of sub-blocks, and wherein the one or more processors are further configured to:
- associate the first intra-prediction mode with each of the plurality of sub-blocks.

40. The apparatus of claim 33, wherein the first block of video data is in a current frame, and wherein the second block of video data is in the current frame.

41. The apparatus of claim 33, wherein the one or more processors are further configured to:
- encode the first block of video data using the inter-prediction mode to form a first prediction;
- encode the first block of video data using the first intra-prediction mode to form a second prediction; and
- combine the first prediction and the second prediction as a weighted sum to produce a final prediction for the first block of video data.

42. The apparatus of claim 33, wherein to determine the second intra-prediction mode for the neighbor block of video data based at least in part on the first intra-prediction mode, the one or more processors are further configured to:
- determine a most probable mode list, wherein the most probable mode list includes the first intra-prediction mode; and
- determine the second intra-prediction mode for the neighbor block of video data from the most probable mode list.

* * * * *